United States Patent
Fukasawa

(10) Patent No.: US 6,567,844 B2
(45) Date of Patent: *May 20, 2003

(54) COORDINATIVE WORK ENVIRONMENT CONSTRUCTION SYSTEM, METHOD AND MEDIUM THEREFOR

(75) Inventor: Toshihiko Fukasawa, Machida (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/789,463

(22) Filed: Jan. 27, 1997

(65) Prior Publication Data

US 2001/0051984 A1 Dec. 13, 2001

(30) Foreign Application Priority Data

Jan. 30, 1996 (JP) .............................. 8-014198
Jun. 13, 1996 (JP) .............................. 8-152326

(51) Int. Cl.⁷ .............................................. G06F 15/16
(52) U.S. Cl. ..................................................... 709/205
(58) Field of Search ...................... 395/200.34–200.36; 345/329–332, 2, 753–756, 2.1–2.2; 709/313, 315, 204–206; 370/260, 263; 348/14.08, 14.11, 14.14, 14.15

(56) References Cited

U.S. PATENT DOCUMENTS

| | | | | |
|---|---|---|---|---|
| 4,987,492 A | * | 1/1991 | Stults et al. | .............. 348/14.08 |
| 5,107,443 A | * | 4/1992 | Smith et al. | ................. 345/331 |
| 5,337,407 A | * | 8/1994 | Bates et al. | .................. 345/331 |
| 5,392,400 A | * | 2/1995 | Berkowitz et al. | ..... 395/200.33 |

(List continued on next page.)

OTHER PUBLICATIONS

Scanlon, E., "The Construction of Physics Simulations in the Alternate Reality Kit," IEE Colloquium on Intelligent Tutorial Systems, IEE, pp. 8/1–8/3, 1988.*

Harju, J., et al., "Quality and Performance of a Desktop video Conferencing System in the Network of Interconnected LANs," Proc. Of the 19th Conf. On Local Computer Networks, 1994, pp. 365–371, Oct. 1994.*

(List continued on next page.)

*Primary Examiner*—Andrew Caldwell
(74) *Attorney, Agent, or Firm*—Morgan & Finnegan, L.L.P.

(57) ABSTRACT

A method and apparatus is provided for realizing the coordinative work environment adaptable to various forms of the coordinative work in a work environment composed of plural computers. A mechanism is disclosed that describes the coordinative work form and effects the coordinative work management process adapted to arbitrary coordinative work form, based on the description of the coordinative work form. The description of the coordinative work form is of what components "logical coordinative work" such as "conference" or "lecture meeting" is composed, and how a correlation exists in the respective components. Furthermore, what operations (e.g., add/delete the "components", add/delete the "correlation", etc.) the operations (e.g., start of session, add user to session, etc.) for "logical coordinative work" correspond to are described. In addition, how the "components" and "correlation" representing "logical coordinative work" correspond respectively to the actual computers, the programs functioning on the computers or the peripheral equipments, and users of the computers is managed. Finally, how the operation of components and correlation corresponds to the process to the computers, the peripheral equipments, or the users is managed. As a result of this management, the operation for "logical coordinative work" as the process to "actual computer and program" is achieved.

22 Claims, 18 Drawing Sheets

U.S. PATENT DOCUMENTS

| | | | | |
|---|---|---|---|---|
| 5,408,470 A | * | 4/1995 | Rothrock et al. | 370/261 |
| 5,442,788 A | * | 8/1995 | Bier | 345/344 |
| 5,446,842 A | * | 8/1995 | Schaeffer et al. | 395/200.35 |
| 5,537,548 A | * | 7/1996 | Fin et al. | 395/682 |
| 5,623,657 A | * | 4/1997 | Conner et al. | 709/320 |
| 5,828,866 A | * | 10/1998 | Hao et al. | 703/7 |
| 5,937,166 A | * | 8/1999 | Fukasawa | 709/229 |
| 5,941,945 A | * | 8/1999 | Aditham et al. | 709/205 |
| 5,999,942 A | * | 12/1999 | Talati | 707/104 |
| 6,021,444 A | * | 2/2000 | Fukasawa | 709/315 |
| 6,286,034 B1 | * | 9/2001 | Sato et al. | 709/204 |
| 2002/0042814 A1 | * | 4/2002 | Fukasawa et al. | 709/204 |

OTHER PUBLICATIONS

Vetter, R., "Videoconferencing on the Internet," Computer, IEEE, vol. 28, No. 1, pp. 77–79, Jan. 1995.*

Earl Craighill, et al., *SCOOT™:An Object–Oriented Toolkit for Multimedia Collaboration*, Proceedings of ACM Multimedia '94, Oct. 15–20, 1994, pp. 41–49.

Pavel Curtis, et al., *The Jupiter Audio/Video Architecture: Secure Multimedia in Network Places*, Proceedings of ACM Multimedia '95, Nov. 5–9, 1995, pp. 79–90.

Ralph D. Hill, et al., *The Rendezvous Architecture and Language for Constructing Multiuser Applications*, ACM Transactions on Computer–Human Interaction, vol. 1, No. 2, Jun. 1994, pp. 81–125.

Mark Roseman and Saul Greenberg, *GroupKit: A Groupware Toolkit for Building Real–Time Conferencing Kit*, Proceedings of the Conference on Computer Supported Cooperative Work, Oct. 31–Nov. 4, 1992, pp. 43–50.

* cited by examiner

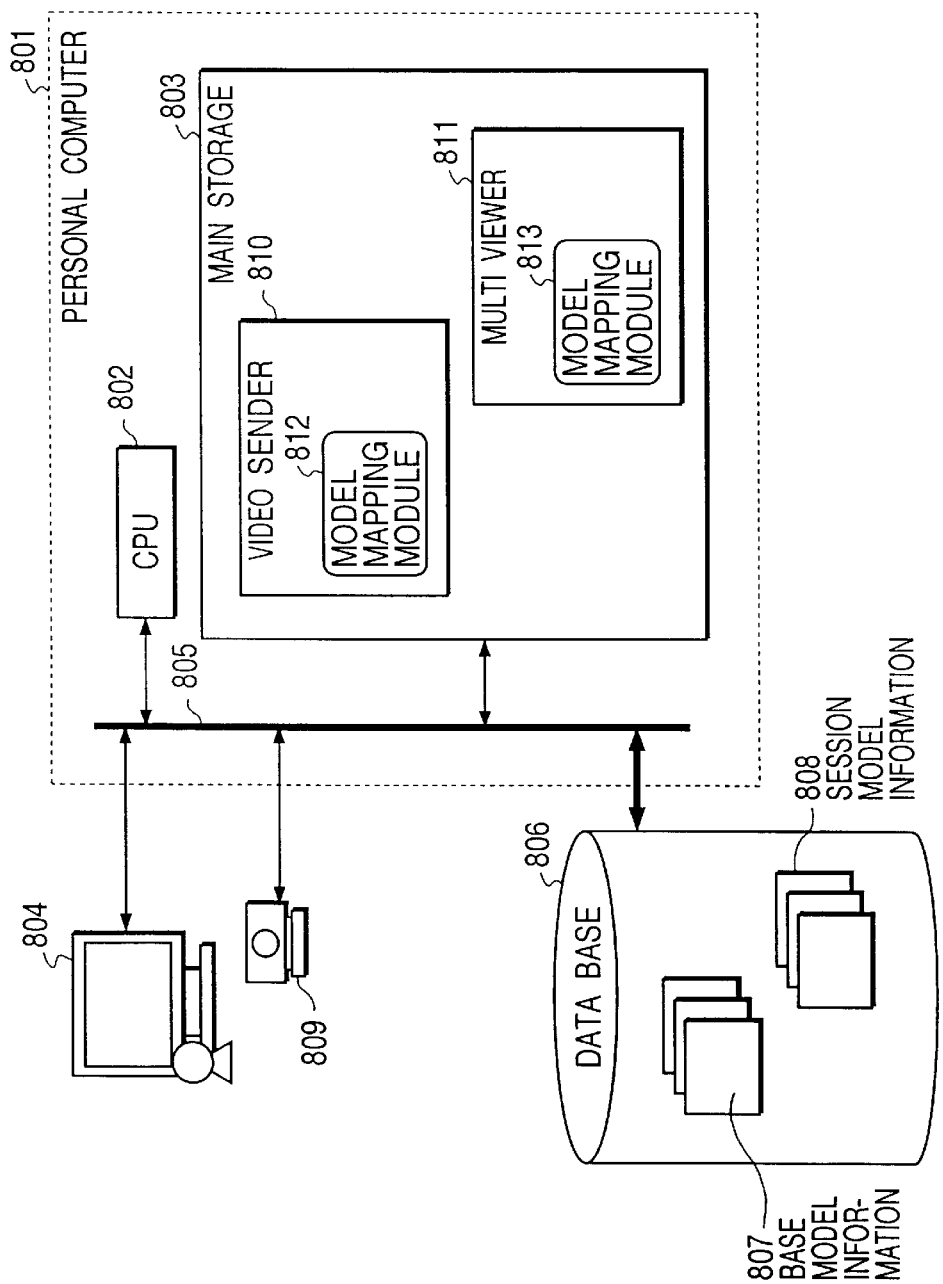

FIG. 16

(COOPERATION BETWEEN COORDINATIVE PROCESS GROUPS)

◆ DESCRIPTION MODEL OF COORDINATIVE PROCESS GROUP
  • PROCESS OF OBJECT FOR CONTROL / RESOURCES
  • PROCESS / COMMUNICATION PATH BETWEEN OR AMONG RESOURCES (ACCESS)

◆ NODE MODEL
COORDINATIVE PROCESS GROUP OF WHICH CSCW APPLICATION CONSISTS IS DESCRIBED AS GATHERING OF
  • HOST IN WHICH CSCW APPLICATION OPERATES AND NODE WHICH REPRESENTS USER ENVIRONMENT ; AND
  • PROCESS WHICH IS OPERATED/MANAGED IN NODE / RESOURCES (MODULE, RESOURCE, CHANNEL)

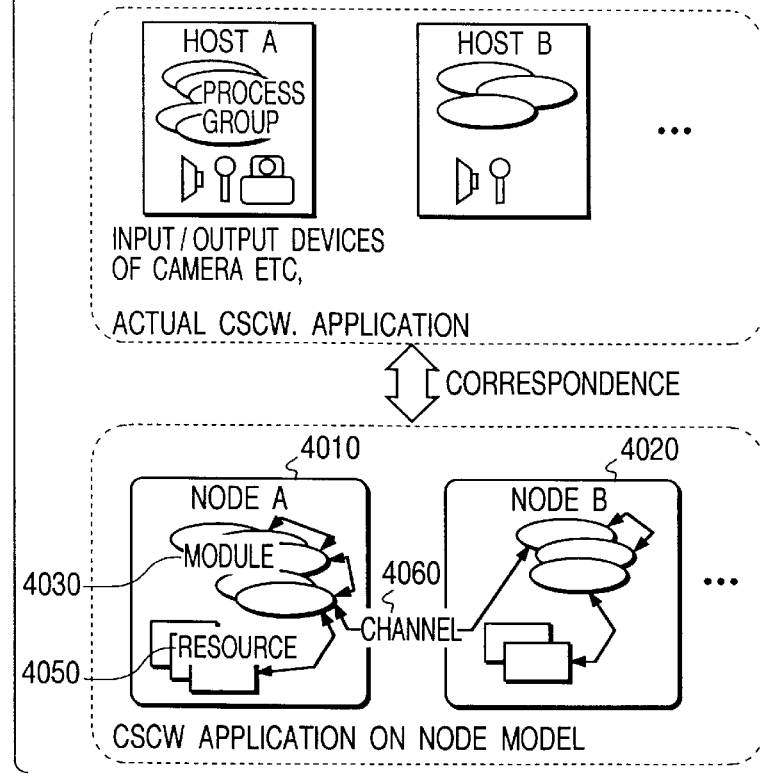

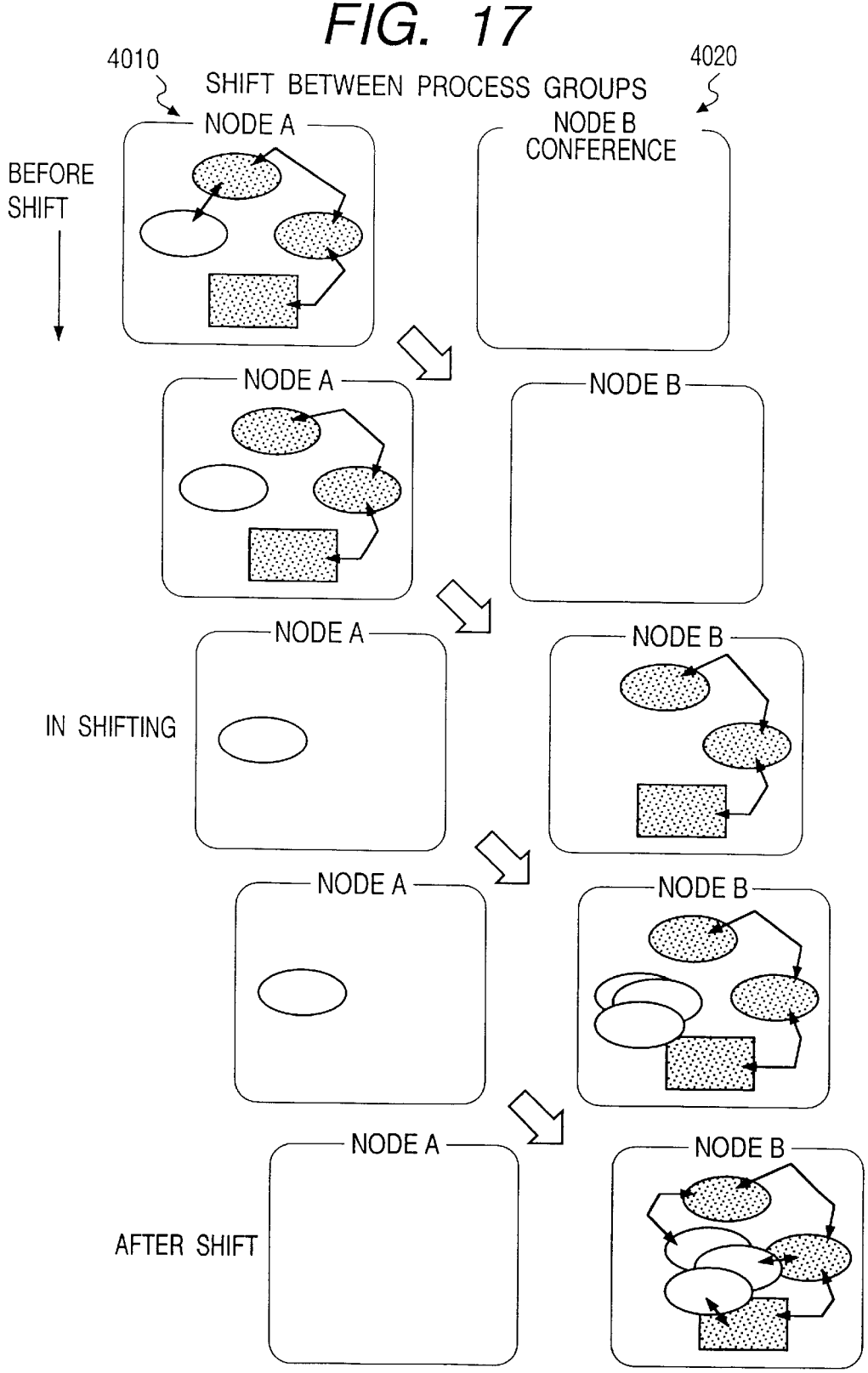

(FORMING OF COMMUNICATION PATH BY CHANNEL)

(COOPERATION SUPPORT IN WORKENV LAYER 3600)

COORDINATIVE WORK ENVIRONMENT CONSTRUCTION SYSTEM, METHOD AND MEDIUM THEREFOR

BACKGROUND OF THE INVENTION

1. Field of the Invention

The present invention relates to a system for realizing a coordinative environment enabling plural users to effect a coordinative work, particularly a coordinative work suitable for video conference, through plural computers, and a method and a medium suitable for such system.

In particular it relates to a coordinative work environment realizing system, capable of providing various coordinative work environments matching various forms of the coordinative work.

2. Related Background Art

There are being recently proposed and utilized groupware systems for supporting a coordinative work by plural users, by combining plural personal computers or work stations, thereby enabling data exchange or common utilization of data therebetween.

In such groupware system, for enabling the computers to execute the coordinative work such as a conference, a presentation or a lecture meeting, that has been executed without relying on the computers, there can be conceived two different approaches, which are:

1. positively supporting specified coordinative works, such as a conference or a lecture meeting; and
2. not supporting any specified form of the coordinative work but managing only the field of the coordinative work, for example a meeting room.

The first approach is adopted in many commercial television conference systems, while the second approach is adopted in many general-purpose coordinative work systems on the computers, such as ShowMe (trade mark) or Communique ! (trade name).

Thus the systems of the first approach are capable of services specified to the particular coordinative works, while those of the second approach do not support the specified coordinative works but provide service only to the common portion (namely the management of the information of the attendees and of the application program used), and can therefore be utilized for various purposes by the users.

Such groupware systems have been discussed, for example, by Earl Craighill et al., "SCOOT: An Object-Oriented Toolkit for Multimedia Collaboration", Proc. ACM Multimedia 94, pp.41–49(1994), Pavel Curtis et al., "The Jupiter Audio/Video Architecture: Secure Multimedia in Network Places", Proc. ACM Multimedia 95, pp.79–90 (1995), Ralph D. Hill et al., "The Rendezvous Architecture and Language for Constructing Multiuser Applications", ACM trans. CHI, vol.1, No.2, pp.81–125(1994), and Mark Roseman et al., "Groupkit: A groupware toolkit for building realtime conferencing applications", Proc. ACM CSCW 92, pp.43–50(1992).

However the conventional groupware systems have been associated with the first or second approach.

The first approach, being specified to the coordinative word of a certain form, such as a conference, lacks flexibility for wider applications. Also it is deficient in developability of the system, since the expansion of the system, such as addition of new functions, cannot deviate largely from the basic model of the coordinative work. Also certain system in the commercial level cannot be considered to sufficiently realize the coordinative work form such as conference on the computers.

On the other hand, in the second approach, since the system provides the minimum support only, the means for supporting the actual coordinative work has to be provided by the application program functioning on the system. This fact increases the burden of the application developer and renders the development of application difficult. Also the simultaneous use of plural applications may cause confusion to the user or trouble in the cooperation between the applications unless such applications assume a unified coordinative work model.

SUMMARY OF THE INVENTION

The above-identified problems are solved and a technical advance is achieved in the art by providing a method and apparatus of realizing the coordinative work environment adaptable to various forms of the coordinative work in a work environment composed of plural computers.

A mechanism is also disclosed that describes the coordinative work form and effects the coordinative work management process adapted to arbitrary coordinative work form, based on the description of the coordinative work form. The description of the coordinative work form is of what components "logical coordinative work" such as "conference" or "lecture meeting" is composed, and how a correlation exists in the respective components. Furthermore, what operations (e.g., add/delete the "components", add/delete the "correlation", etc.) the operations (e.g., start of session, add user to session, etc.) for "logical coordinative work" correspond to are described. In addition, how the "components" and "correlation" representing "logical coordinative work" correspond respectively to the actual computers, the programs functioning on the computers or the peripheral equipments, and users of the computers is managed.

In accordance with an aspect of the invention, there is provided a system for the coordinative work environment construction system. An exemplary system includes: support means for supporting a plurality of coordinative works by plural computers; description means for describing logical components, a relation between the logical components, and a relation between a component of the logical components and a logical operation of the coordinative works, wherein the logical components are defined by action of the coordinative works; shifting means for shifting one coordinative work to another coordinative work n the basis of the described logical components and the relation between the component of said logical component and the logical operation of the coordinative work, wherein said shifting means is adapted to shift by re-utilization or common use of the described logical components and a relation between the logical components and the logical operation of the coordinative works; and means for effecting an actual work management process by transmitting a moving image and voice, fetched from a camera and a microphone, on the basis of the described logical components and operations of the coordinative work.

In accordance with another aspect of the invention, there is provided a method for the coordinative work environment. An exemplary method includes: supporting a plurality of coordinative works by plural computers; describing logical components and operations of the coordinative works, wherein the logical components are defined by action of the coordinative works; shifting one coordinative work to another coordinative work on the basis of the described logical components and the relation between the component of said logical component and the logical operation of the coordinative work, wherein said shifting is adapted to shift by reutilization or common use of the described logical components and a relation between the logical components and a logical operation of the coordinative works; and effecting an actual coordinative work management process by transmitting a moving image and voice, fetched from a camera and a microphone, on the basis of the described logical components, a relation between the respective components, and a relation between the component of said logical component and a logical operation of the coordinative work.

Other and further aspects of the present invention will become apparent during the course of the following detailed description and by reference to the attached drawings.

BRIEF DESCRIPTION OF THE DRAWINGS

FIG. 8 is a view showing the configuration of a remote awareness system constituting a second embodiment of the present invention;

FIG. 16 is a view showing coordination among coordinative process groups in another embodiment;

FIG. 17 is a view showing process shift among coordinative process groups in another embodiment;

DETAILED DESCRIPTION OF THE PREFERRED EMBODIMENTS

Now there will be explained a first embodiment of the present invention, with reference to the attached drawings.

Figure 1:
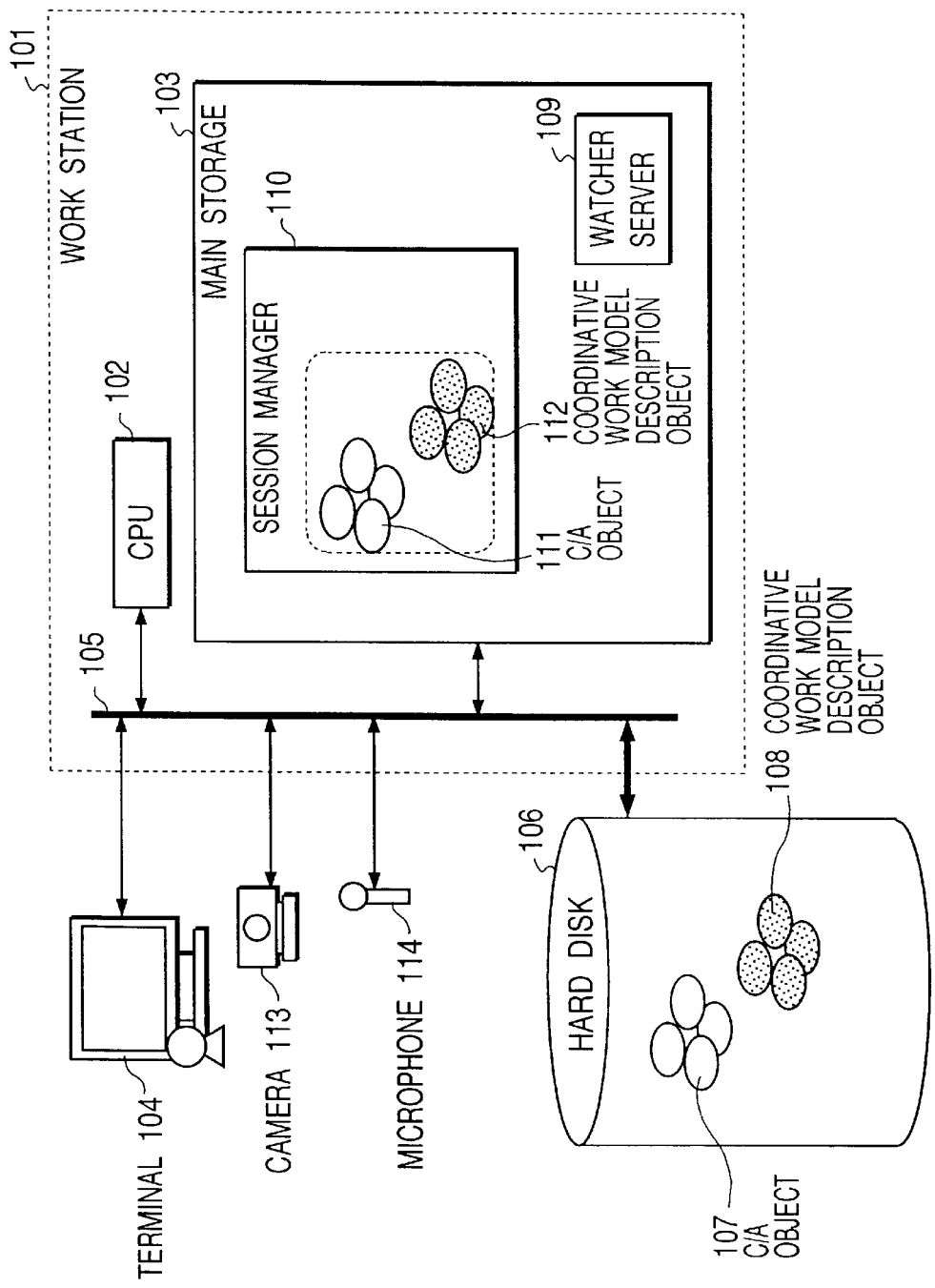
FIG. 1 is a view showing the configuration of a conference system constituting a first embodiment of the present invention.

FIG. 1 is a view showing the configuration of a conference system constituting the present embodiment. In FIG. 1, a work station 101 is composed of a CPU 102 for process execution in the present embodiment, and a main storage 103 storing a session manager 110, which is the basic software of the present conference management system, through a computer bus 105.

A hard disk 106 for storing permanent data required for the process of the present embodiment, a terminal 104 providing a user interface enabling the user to operate the system, a camera 13 for taking the image of the user, and a microphone 114 for voice input are connected to the work station 101.

The hard disk 106 stores two groups of data, namely a C/A object 107 and a coordinative work model description object 108. These data are managed by a server program called watcher server or watcher 109. In FIG. 1, the hard disk 106 and the watcher 109 constitute a part of the work station 101, but they are ordinarily combined with another work station capable of communication through the computer network and are rarely used on the same machine as that of the session manager 110.

The C/A object 107 and the coordinative work model description object 108 will be explained later in more details, but are considered as objects described by the C++ program language. The session manager 110 has copies 111, 112 of these data. In handling these data, the session manager 110 does not refer to the hard disk 106 but to the copies 111, 112 present in the address space of the session manager.

Matching of the data 107, 111 and 108, 112 is assured by the watcher 109. This is achieved, in case of a change in the values of the data 111, 112, by informing the watcher 109 of the content of such change. According to the notice for a change, the watcher 109 varies the data 107, 108 and also informs other session managers, functioning on different work stations of the content of such change.

The session manager 110 realizes a conference among remote locations by transmitting a moving image and voice, fetched from the camera 113 and the microphone 114, to other session managers, and displaying, on a display 104, the moving image and reproducing the voice received from other session managers.

Figure 2:
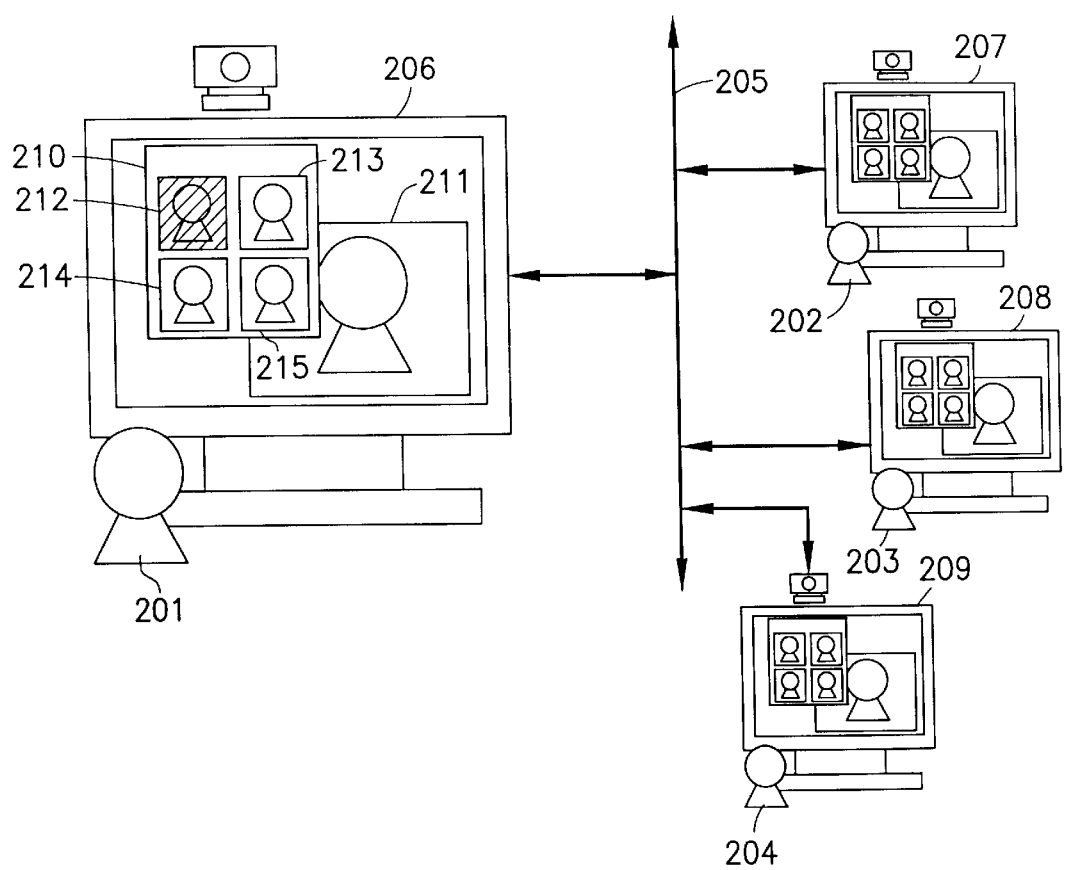
FIG. 2 is a view for outlining the system of the first embodiment.

FIG. 2 is a view outlining the present embodiment, seen from a user. In FIG. 2, plural users 201, 202, 203, 204 are executing a work on the work stations combined by a computer network 205. Each of the user displays 206, 207, 208, 209 displays windows such as 210, 211, and the window 210 displays icons 212, 213, 214, 215 representing the attendees of the coordinative work.

The present embodiment is assumed to support, as the coordinative work, a general "conference", which may also be called session in the present embodiment.

A role called "chairman" may be assigned to one of the attendees of the session. The icon 212 in emphasized display indicates that the represented use is the "chairman". An attendee inviting the session becomes the chairman, so that only one chairman exists in a session. The role of the chairman is to designate the speaker.

The window 211 displays the moving image and the voice of the current speaker. These data of the speaker are similarly displayed on the displays of all attendees, as on the display 206. The speaker alone can provide all the attendees of the session with the information of moving image and voice. For the purpose of simplicity, the present embodiment assumes only one speaker at a time. Until the "chairman" makes a designation, the "chairman" functions also as the speaker. Like the "chairman", the speaker can also be regarded as a user to whom the role of "speaker" is assigned.

The present embodiment is at first featured by providing means for defining and describing the properties of the above-mentioned form of the coordinative work.

The present embodiment provides, as the description means, a $C^{++}$ class group, called C/A object model and described by the $C^{++}$ program language (This class group is called C/A class, and the instance of the C/A class is called C/A object).

The present embodiment employs the C/A class and the C/A object by the $C^{++}$ program language as the description means of the coordinative work model, but, as the present invention is not limited to the functions provided by the $C^{++}$ program language, similar description is also possible by various program languages such as Objective-C, C, CLOS or Lisp.

Utilizing such C/A object, the programmer of system or application describes the coordinative work form to be processed.

The following are defined as the C/A classes:

Attendee; Cpath; CollabField; and Activity.

The methods of these classes correspond to the operation primitive of the entity constituting the models of the classes.

Attendee

This is a class modeling the attendees of the coordinative work.

Cpath

This is a class representing the transmission path of the information, formed from an attendee to another (Cpath being abbreviation of Communication Path). On the C/A object, it represents the transmission path between the attendees. The attendee at the information sending side is called "sender", and that at the information receiving side is called "receiver".

CollabField

Figure 3:
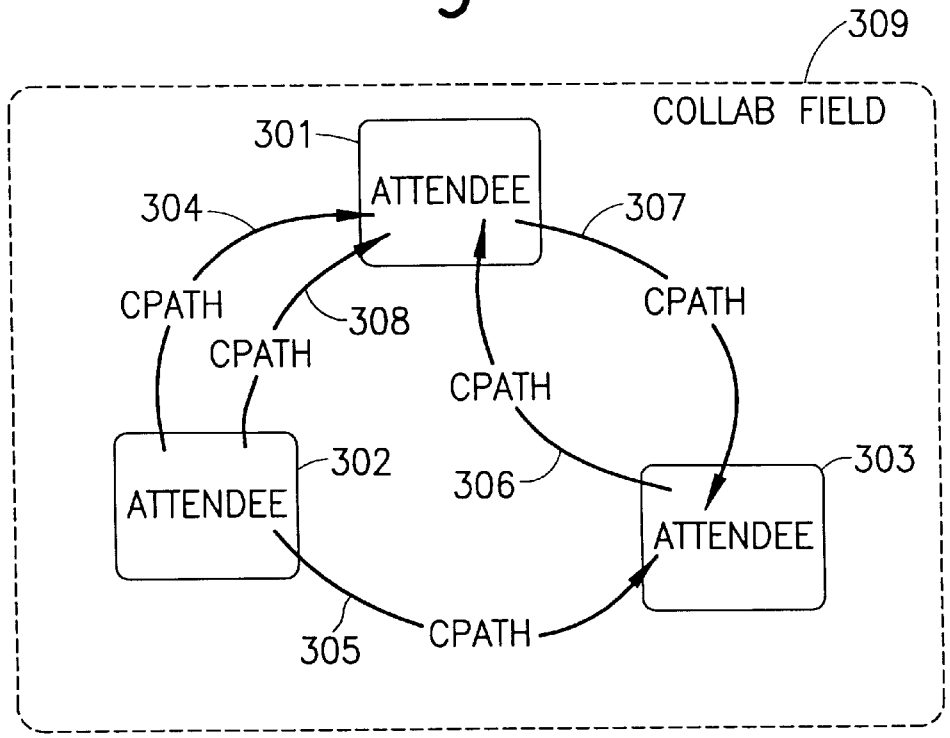
FIG. 3 is a view showing CollabField in a C/A object model.

It represents a field or an environment of the coordinative work, formed by the attendees and the Cpath, as shown in FIG. 3 (CollabField being abbreviation of collaboration field). In FIG. 3, 301 to 303 indicate Attendees, which can be considered to correspond to the attendees of the coordinative work. 304 to 308 are Cpaths representing the information transmission paths among the Attendees. These components constitute the CollabField 309.

As will be apparent from FIG. 3, the Cpath is a one-directional transmission path from an Attendee to another, but all the Attendees do not necessarily form the Cpaths equally. For example, in FIG. 3, only one Cpath 305 exists between the Attendees 302 and 303. This indicates that the transmission of information is not possible from the Attendee 303 to 302. Also any number of Cpaths of a same direction may be formed between given Attendees. In FIG. 3, two Cpaths 304, 308 of a same direction are formed, corresponding to a fact that plural transmission means such as image, voice and text are available for the transmission of information between the attendees. However there is no restriction that a Cpath has to correspond to a transmission means, and a Cpath may correspond to plural transmission means.

Activity

Figure 4:
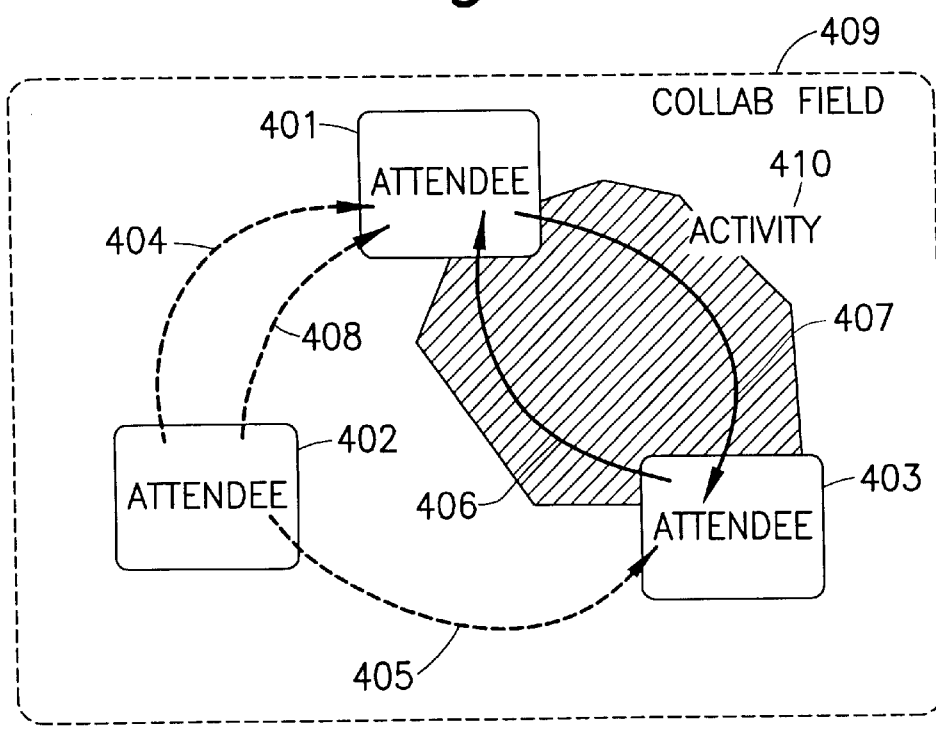
FIG. 4 is a view showing Activity in the C/A object model.

Even when the CollabField is formed and the Cpaths are formed among the Attendees, the transmission of information is not necessarily conducted thereon. For this reason, it is necessary to distinguish the Cpath actually used for the transmission of information and that not used therefor. The former is called an active Cpath while the latter is called an inactive Cpath, and a group solely consisting of the active Cpaths on the CallabField is called Activity. The CollabField represents the field of coordinative work, while the Activity represents the mode of coordinative work. FIG. 4 shows the Activity 409, superposed on the CollabField shown in FIG. 3. In FIG. 4, the components 401 to 409 correspond respectively to those 301 to 309 in FIG. 3, but the active Cpaths 406, 407 are represented by solid lines while other inactive Cpaths are represented by broken lines. As the Activity 410 in FIG. 4 only contains Cpaths 406, 407, it will be understood that the current coordinative work is executed only between the attendees 401 and 403.

The coordinative work form such as the above-mentioned "Conference" can be described by a combination of the C/A objects. Such description may be particularly called "coordinative work model description", which consists of the following parts:

correlation between the constituent component of the described coordinative work and the C/A object;

declaration of the operation executable by the attendee, relative to the described coordinative work; and description of the process, corresponding to the above-mentioned operation, by the operation of the C/A object.

In the present embodiment, the coordinative work model description of the session ("conference") is executed in the following manner. The constituent components of the session include: Session, User, Chairman, Participant and Speaker. Session is a component corresponding to the session and represents a "conference". User means the attendee of the session. Chairman, Speaker and Participant are roles respectively corresponding to the "chairman", the "speaker" and the "other attendee". Because of the nature of the session, the Session must always contain an Attendee having the role of the Chairman.

Thus, following correlations stand between the above-mentioned components and the C/A objects:

Session←—→CollabField

User←—→Attendee

Chairman, Speaker, Participant←—→Partial group of activity having a specified Attendee as sender or receiver.

These correlations indicate that the behavior of the above-mentioned components can be dealt with as the behavior of the corresponding C/A objects.

Then there are defined operations executable by the user to the "conference".

| Operation | Meaning |
|---|---|
| BeginSession | start of session |
| TerminateSession | end of session |
| AddUserToSession | add user to session |
| RemoveUserFromSession | remove user from session |
| Following operation can only be executed by the current "chairman": | |
| BeSpeaker | designate "speaker" |

Each of the above-mentioned operations can be given the description of an argument and a process as will be explained in the following. (The description is made with the $C^{++}$ language, but, for the purpose of clarity, the following explanation is by the ordinary language.)

BeginSession

Argument: User list:

1. Prepare a list of Attendees corresponding to the given list of Users;

2. Generate two CollabFields, one being for the conference management around the "chairman", the other being for the information transmission in the conference around the "speaker". For the purpose of simplicity, the former is called ChairmanField while the latter is called SpeakerField;

3. Execute BeChairman in order to appoint the user, requesting this process, as the "chairman";

4. Execute BeSpeaker in order to appoint the user, requesting this process, as the "speaker";

5. Generate Session corresponding to the CollabField and Activity generated in 2 and 3 (These CollabField and Activity are managed in the generated Session.

In the designing of a coordinative work model, it is also possible not to conceal these CollabFields in the Session but to assign the corresponding components to these CollabFields. In the present embodiment, however, only the Session is defined on a standpoint that the distinction of these two CollabFields is not obvious to the user. It is also possible to model the session by a single CollabField instead of dividing it into the ChairmanField and the SpeakerField, but the operations of the CollabField become more complex.

Figure 5:
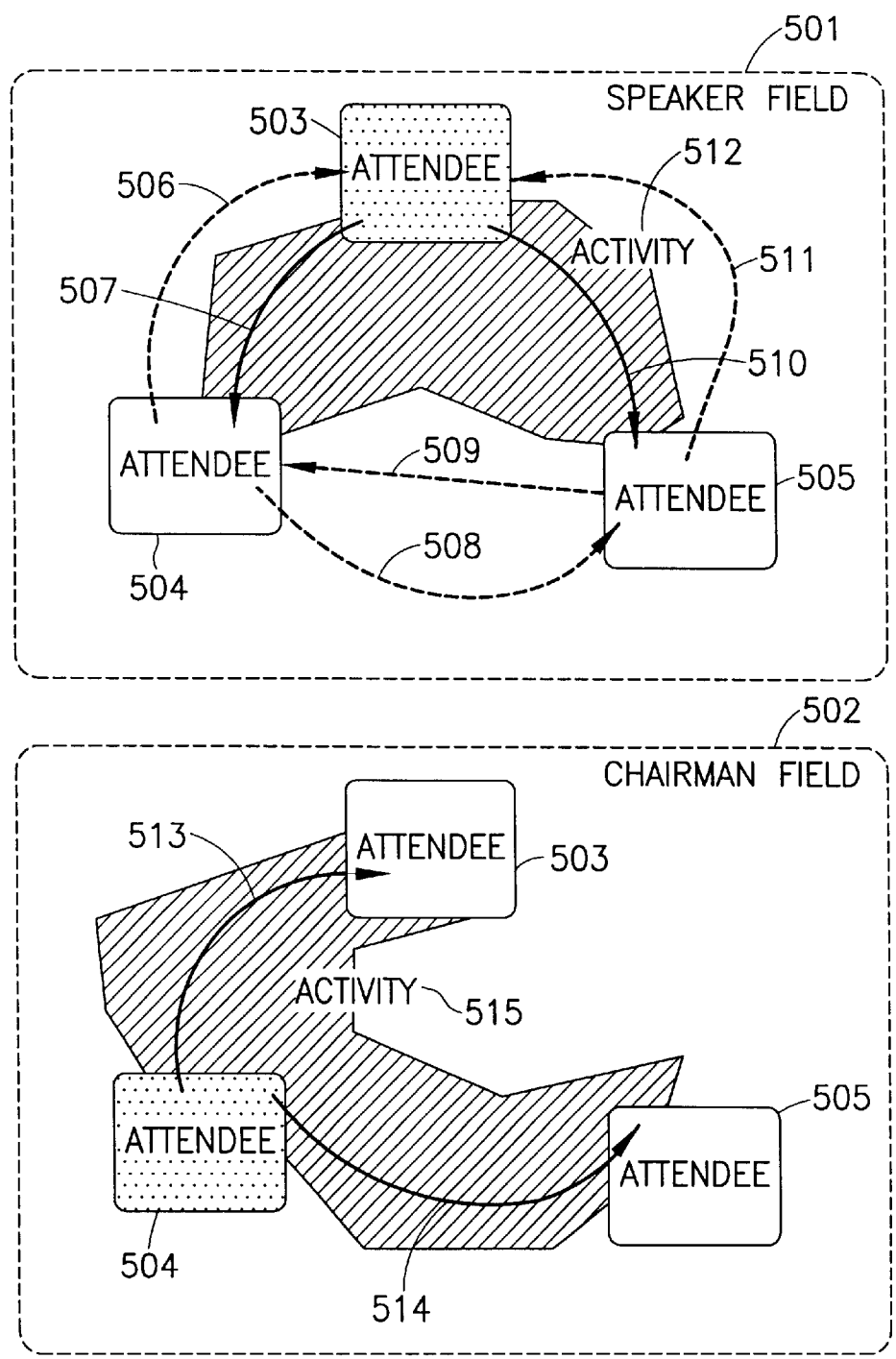
FIG. 5 is a view showing an example of the C/A object formed by the conference system.

FIG. 5 shows the CollabField and the Activity generated by the BeginSession. In FIG. 5, there exist two CollabFields, namely the SpeakerField 501 and the ChairmanField 502. In the SpeakerField 501, there are three Attendees 503, 504, 505 which respectively correspond to the attendees of the session. Among all the Attendees 503, 504, 505 of the SpeakerField 501, there are formed Cpaths 505 to 511 bidirectionally.

If the Attendee 503 in emphasized display has the role of "speaker", only the Cpaths 507, 510 having the Attendee 503 as the sender and the other attendees 504, 505 as the receivers belong to the Activity 512. Most of the Cpaths remain inactive, but they can also become active when other Attendees assume the role of the "speaker".

The ChairmanField 502 contains the same Attendees 503, 504, 505 as in the SpeakerField 501, but there are only formed Cpaths 513, 514 having the Attendee 504 in the role of the "chairman" as the sender and the other Attendees 503, 505 as the receivers and they belong to the Activity 515. In the present system, since the "chairman" is not transferred to any other Attendee (withdrawal of the chairman being regarded as the end of the conference), it is not necessary to render inactive Cpaths as in the SpeakerField.

In the present embodiment, the Cpath can be unconditionally rendered active or inactive, but a finer control of the data flow is also possible by adding appropriate conditions to the Cpath.

TerminateSession
Argument: none
1. Demolish CollabField and Activity managed in the Session, and erase all the existing Cpaths.
 +AddUserToSession
Argument: User to be added
 1. Generate Attendee corresponding to the added User;
 2. Add the generated Attendee to the two CollabFields in the Session;
 3. Add Cpaths connecting the added Attendee with other Attendees, to the two CollabFields. In the SpeakerField, bidirectional Cpaths are added in order to enable bidirectional information transmission.
 In the ChairmanField, only one Cpath is added from the Attendee in the role of the "chairman" to the added Attendee;
 4. Render the Cpath added the ChairmanField active and add it to the ChairmanField;

5. Among the Cpaths added to the SpeakerField, render the Cpath from the Attendee in the role of the "speaker" to the added Attendee active, and add such Cpath to the SpeakerField.
RemoveUserFromSession
Argument: User to be removed
 1. Extract Attendee corresponding to the removed User (Correlation between the user and the Attendee is managed in a form that the Attendee is embedded in the data structure of the User);
 2. Delete, in the two CollabFields, all the Cpaths connecting the removed Attendee with other Attendees;
 3. Delete the Attendee from the two CollabFields in the Session.
BeSpeaker
Argument: User becoming Speaker
 1. Extract Attendee from the designated User, and render all the Cpaths, having such Attendee as the sender in the SpeakerField, active.

The components and the operations of the coordinative work form described as explained in the foregoing are realized as the class of $C^{++}$ and incorporated in the session manager. More specifically, the components are realized as a $C^{++}$ class, and the operations are incorporated as the methods of the $C^{++}$ class. In the "conference" of the present embodiment, since all the operations relate to the Session only, the above-mentioned descriptions of operations become the method of the $C^{++}$ class corresponding to the Session. The instances of such class are the coordinative work description objects.

Figure 6:
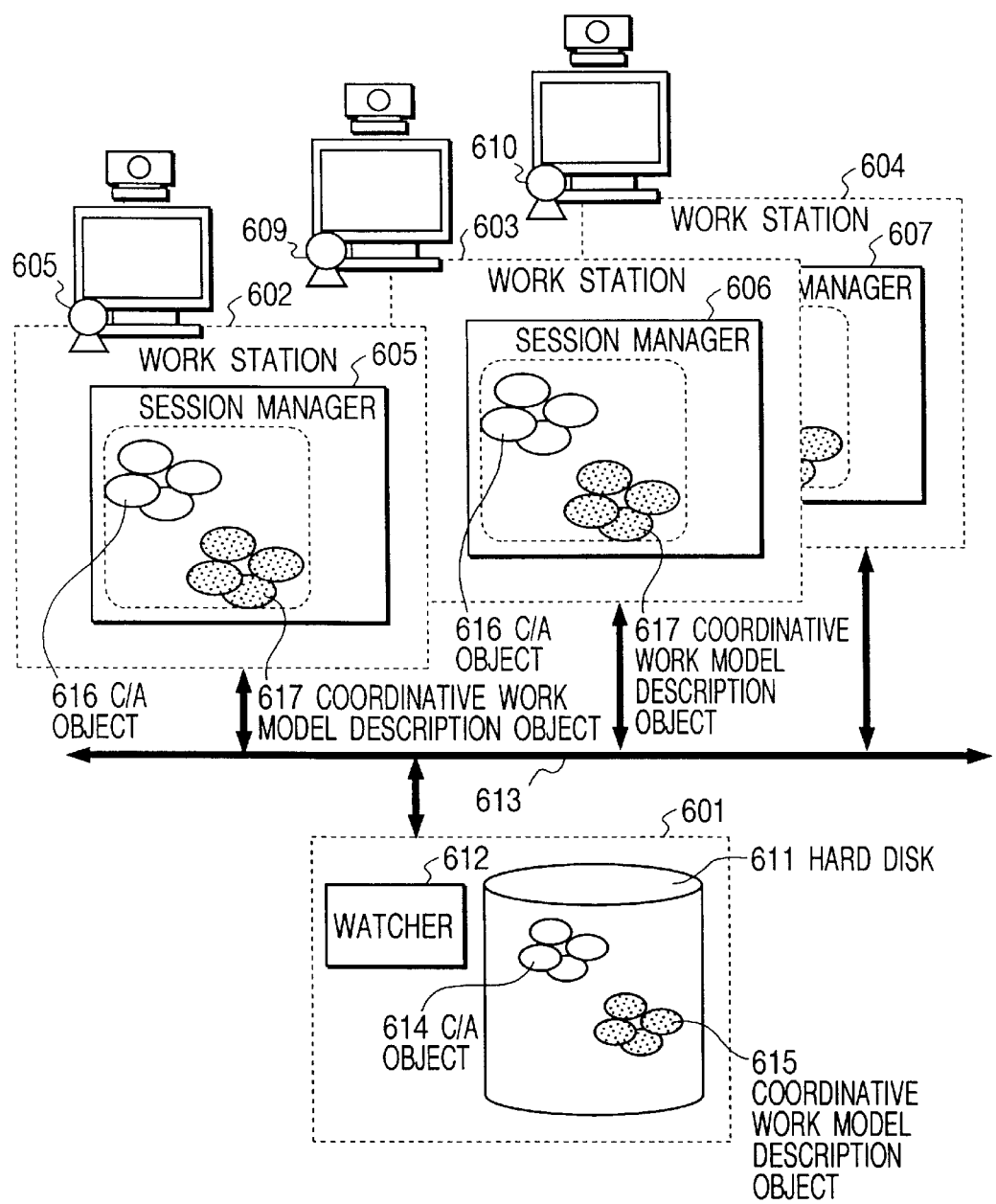
FIG. 6 is a view showing the process flow in the foregoing system.
Figure 7A:
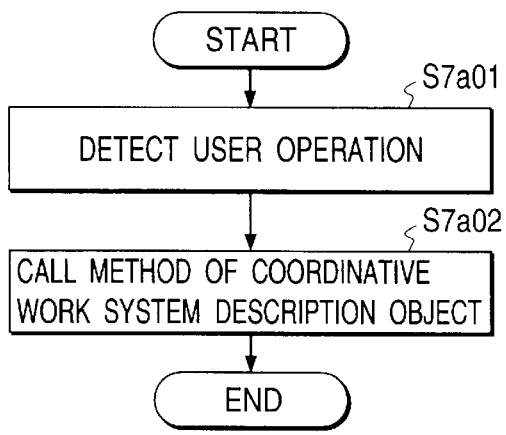
FIGS. 7A, 7B and 7C are flow charts showing the process flow in FIG. 6.
Figure 7B:
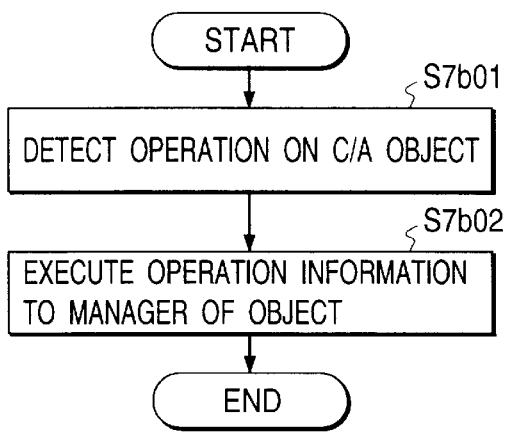
Figure 7C:
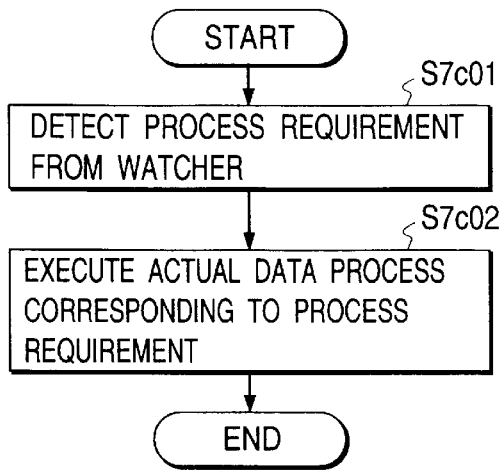

Now reference is made to FIG. 6 for explaining the process flow for controlling the behavior of the system by the incorporated coordinative work model description. FIGS. 7A, 7B and 7C are flow charts of such process, consisting of three short flow charts 7a, 7b, 7c, wherein 7a indicates the behavior of the Session manager 605 in FIG. 6, while 7b and 7c indicate the behaviors respectively of the watcher 612 and the Session manager 606.

In FIG. 6, it is assumed that three users 608, 609, 610 are conducting a conference by the present system, utilizing work stations 601, 602, 603, 604 connected by a network 613. In the work stations 602, 603, 604 used by the users there are activated the Session managers 605, 606, 607, and, in the work station 601, there functions the watcher 612 managing the hard disk 611, which manages therein the C/A object 614 and the coordinative work model description object 615. Also in the Session manager 605, there are managed the copy 616 of the C/A object group 614 and the copy 617 of the coordinative work model description object 615.

Now, referring to FIG. 6, there is assumed the execution by the user 608 of an operation, such as the start of the session, utilizing the user interface provided by the Session manager 605.

Upon detecting the operation of the user 608 (S7a01), the Session manager 605 calls the method of the coordinative work system description object 617 and executes the operation of the user on the C/A object 616 (S7a02). In the "conference" of the present embodiment, there is executed the method corresponding to the user operation of the $C^{++}$ class which corresponds to the Session.

The operation on the C/A object is monitored by the watcher 612 (In the present embodiment, for the purpose of such monitoring, any operation on the C/A object always contains a final process of informing the watcher 612 of the executed operation). The monitoring can also be realized by a mechanism of informing any change of the data, as provided in certain databases.

The watcher 612, upon detecting an operation on the C/A object managed thereby (S7b01), informs the manager of the object of such operation and request the execution of a process corresponding to such operation (S7b02).

The manager of the object means a process that has generated such object (also called the object manager). In the present embodiment, as the C/A object is usually generated by the Session manager, it becomes the object manager.

The Session manager (606), if being the object manager, receives the process request (S7c01), which in the present conference system is an addition/deletion of the Cpath to/from the CollabField, and to/from Activity. (These will be understood from the content of description of the operation in the aforementioned coordinative work model description.).

In response to such process request, the Session manager 606 executes the following processes (S7c02):

Addition of Cpath to CollabField: to form actual transmission paths for the moving image and the voice, corresponding to Cpath;

Deletion of Cpath from CollabField: to close actual transmission paths for the moving image and the voice, corresponding to Cpath;

Addition of Cpath to Activity: to transfer actual data in the actual transmission paths for the moving image and the voice, corresponding to Cpath;

Deletion of Cpath from Activity: to terminate data transfer in the actual transmission paths for the moving image and the voice, corresponding to Cpath.

As will be apparent from FIGS. 7A to 7C, the individual operations of the Session managers 605, 606 and of the watcher 612 are very simple. The coordinative work model description may be regarded as the description of a combination of these operations.

As explained in the foregoing, the present embodiment defines the C/A object as the description means of the coordinative work form and the coordinative work model description for describing the "conference" by the C/A objects, and provides, under such definitions, server programs of the Session manager and the Watcher for controlling the system.

It realizes a remote conference system by providing the coordinative work model description for the "conference" modeled with the roles of the chairman and the speaker, and also providing the Session manager program as the user interface.

The present embodiment has explained the description and the realization of the "conference" as the coordinative work form, but the C/A objects and the Watcher server of the present embodiment can be used for describing and realizing various coordinative work forms, in addition to the "conference". The Session manager excluding the user interface is so realized as to process the operations on the C/A object not dependent on the coordinative work form. Consequently the Session manager can be utilized on the coordinative work systems other than the "conference".

The present embodiment of the invention has enabled realization of a remote conference system capable of supporting complex coordinative work forms such as the supporting of the roles, in comparison with the conventional conference systems.

The present embodiment involves certain restrictions such as the limitation to only one speaker, but such restrictions are not essential on the C/A objects. It is therefore possible to define and realize the coordinative work model description without such restrictions, by means of the C/A objects.

[Other Embodiments]

In contrast to the first embodiment constituting a conference management system, a second embodiment of the present invention provides a remote awareness system for controlling cameras in plural locations.

The remote awareness system allows to call the images of cameras in suitable locations onto the display, thereby recognizing the current status of the remote locations. It is different from the coordinative work in strict sense as in the conference, but can be regarded as a coordinative work of a wider sense, in providing means for the information exchange among the users as a preparatory stage for the coordinative work. Such remote awareness system can also be constructed according to the present invention.

At first reference is made to FIG. 8 for explaining the principal components of the present embodiment. A personal computer (hereinafter also simply called machine) 801 is composed of a CPU 802 executing the processes of the present embodiment and a main storage 803 storing VideoSender 810 and MultiViewer 811 constituting the softwares of the present embodiment, connected mutually by a computer bus 805. However the present system is not limited to the personal computers but is applicable also to work stations similar to those in the first embodiment. The VideoSender 810 is a program for fetching the image of a camera 809 and sending it to MultiViewer 811, while the MultiViewer 811 is a program for displaying the received image on a display 804.

Also a database 806 for storing the common data required for the operations of the present system, a display 804 for providing a user interface allowing the user to execute the operations of the system, and a camera 809 for fetching the ambient image of the user are connected to the machine 801.

In FIG. 8, the VideoSender 810 and the MultiViewer 811 function on a same machine, but, in the present system, either one may function on a difference machine connected by the computer network. In case the VideoSender 810 functions in another machine, the camera 809 is installed on the machine in which the VideoSender 810 exists.

The database 806 holds base model information 807 and session model information 808 similar to those in the first embodiment. They have information same as that in the C/A objects and the coordinative work model description objects in the first embodiment, but in a text data format of ASCII character train instead of the $C^{++}$ language objects as in the first embodiment.

The database 806 itself has a mechanism of managing the permanence and continuity of data as in the general relational database or the object oriented database, but the present embodiment adopts, among such databases, one having a mechanism of automatically informing the client of a renewal of the data in the database (variation informing function). If the database lacks such mechanism, the variation informing function has to be provided by a separate server such as the watcher in the first embodiment.

In the present embodiment, there is assumed a case where the data format in the MultiViewer 811 and the VideoSender 810 is different from that in the database 806. For this reason, model mapping modules 812, 813 for conversion between the data formats are incorporated in the MultiViewer 811 and in the VideoSender 810. The model mapping modules 812, 813 are realized as interpreters of the TCL program language. More specifically, the data base 806 contains base model information 807 and the session model information 808 in the form of TCL scripts and related data. (As to TCL, reference is to be made to "Tcl and the Tk Toolkit", John K. Ousterhout, Addison-Wesley, 1994.) The model mapping modules 812, 813 also provide interfaces for reference, renewal, interpretation and execution of the session model information 1115 and the base model information 1114 for other modules in the program. Therefore, in the sense of the programming model, the model mapping modules 812, 813 perform functions similar to those of the objects in the C++ language.

In the present embodiment, the information on the database 806 is not copied. Therefore, when necessary, the model mapping modules 812, 813 have to refer to the database 806.

In the following, the present system will be explained from the standpoint of the user, with reference to FIG. 9, wherein three users 901, 902, 903 are executing a work on the respective machines which are connected by a network 912 to enable mutual data communication.

Cameras 907, 908 are installed at the users 901, 902, and displays 904, 905 display windows 909, 910 constituting the user interface of the VideoSender. Utilizing the user interface of the windows 909, 910, the users 901, 902 effect control (size, image quality and designation of whether or not to disclose the image to other users) of the images fetched by the cameras 907, 908.

Also the display 906 of the user 903 displays a window 911 providing the user interface of the MultiViewer. This window provides the user interface for displaying the images from the cameras 907, 908 or displaying the image of the camera installed at another machine.

Figure 9:
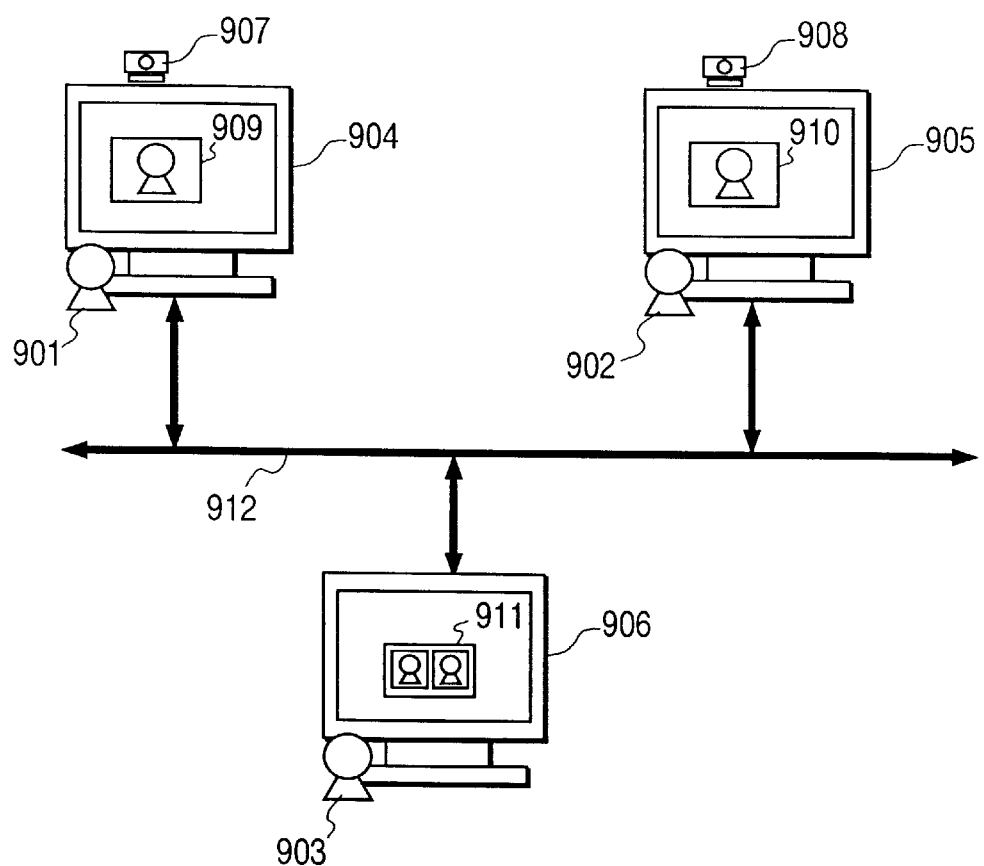
FIG. 9 is a view for outlining the system of the second embodiment.

In FIG. 9, the user 903 can cause the monitor to display the images of other users 901, 902, thereby recognizing the status.

The description of the base model information in the present embodiment also has the following components:

Attendee, Cpath, CollabField and Activity as in the first embodiment, with the same meanings as therein. However, in the present embodiment, since the description is made by the TCL language, the above-mentioned components are defined as TCL functions, which have the following basic structure:

proc Attendee {args}{
head of argument is designation of operation primitive
eval "[lindex $args 0] $args";
}

The above-mentioned script defines the Attendee as a process for calling a function of a name same as that of the operation primitive designated at the head of the argument. Other components are also defined similarly:

The remote awareness can be represented, in the coordinative work model description as in the first embodiment, in the following manner. In the present embodiment, the coordinative work described by the base model is called session model information, which can be prepared in the same manner as in the first embodiment. The components of the remote awareness are:

AwarenessSession, VideoSenderAttendee and MultiViewerAttendee whereby defined are AwarenessSession for abstracting the remote awareness activity, and VideoSenderAttendee and MultiViewerAttendee corresponding to the processes of VideoSender and MultiViewer.

The VideoSenderAttendee and the MultiViewerAttendee correspond to Attendees. While the users correlate to the Attendees in the "conference" of the first embodiment, the processes are correlated with the Attendees in the "remote awareness" of the present embodiment, so that the users and the Attendees are not correlated on the model, though they are not completely isolated in the sense that the programs are activated by the users.

The AwarenessSession is correlated with the CollabField but is merely defined as a container therefor, and such concept as the AwarenessSession is not given by the interface provided to the users. In a wider sense, the window 911 in FIG. 9 corresponds to the AwarenessSession.

Then the operations executable by the user for the services are defined for each of MultiViewerAttendee and VideoSenderAttendee. For the MultiViewerAttendee there can be defined the following operations:

| Operation | Meaning |
| --- | --- |
| ConnectSender | Connection with VideoSender |
| DisconnectSender | Disconnection from VideoSender | and, for the VideoSenderAttendee:

| Operation | Meaning |
| --- | --- |
| MarkeAvailableFor | Permit image transmission to a specified Viewer |
| MakeDisableFor | Inhibit image transmission to a specified Viewer |

These operations are represented on the base model as the following processes. In the present embodiment, the following processes are described by the TCL language, but the following explanation is made with the ordinary language.

ConnectSender
Argument: VideoSenderAttendee to be connected
1. Generate AwarenessSession if MultiViewerAttendee has not generated AwarenessSession, and add Attendee corresponding to MultiViewerAttendee to CollabField in the generated AwarenessSession;
2. Extract corresponding Attendee from the given VideoSenderAttendee and add it to CollabField in AwarenessSession;
3. Add Cpath from the added Attendee to the self Attendee to CollabField in the AwarenessSession.

DisconnectSender
Argument: VideoSenderAttendee connected
1. Extract Attendee from the given VideoSenderAttendee and delete it from CollabField in AwarenessSession.
Also delete, from CollabField, all the Cpaths having the Attendee as the sender or the receiver.

MakeAvailableFor
Argument: MultiViewerAttendee requesting image
1. Extract corresponding Attendee and AwarenessSession from the given MultiViewerAttendee;
2. Also extract CollabField from AwarenessSession;
3. In the extracted CollabField, render active the Cpath having the self Attendee as the sender and the Attendee extracted from MultiViewerAttendee as the receiver;
4. Start transmission of the moving image and the voice to the actual transmission paths of the moving image and the voice corresponding to the active Cpaths.

MakeDisableFor
Argument: MultiViewerAttendee requesting image
1. Extract corresponding Attendee and AwarenessSession from the given MultiViewerAttendee;
2. Further extract CollabField from the AwarenessSession;
3. Render inactive Cpath having the self Attendee within the extracted Collabfield as the sender and the Attendee extracted from MultiViewerAttendee as the receiver;

4. Terminate transmission of the moving image and the voice to the actual transmission paths of the moving image and the voice corresponding to the deactivated Cpath.

The components and operations of the coordinative work form, described in the above-explained manner, are described as the TCL processes and managed as the session model information in the database. As an example, the MultiViewerAttendee is defined as follows:

```
proc MultiViewerAttendee (args) {
    global mv_attendee_table;
    # head of argument being designation of
    operation primitive eval "[lindex $args 0]
    $args";
}
```

Thus the description is made as a process, similarly as the components in the base model explained above. Also the correlation between Attendee and MultiViewerAttendee is managed by mv_attendee_table defined as an association arrangement, and the correlation table is also contained in the session model information.

In the above-explained description, "eval" means evaluation.

Figure 10:
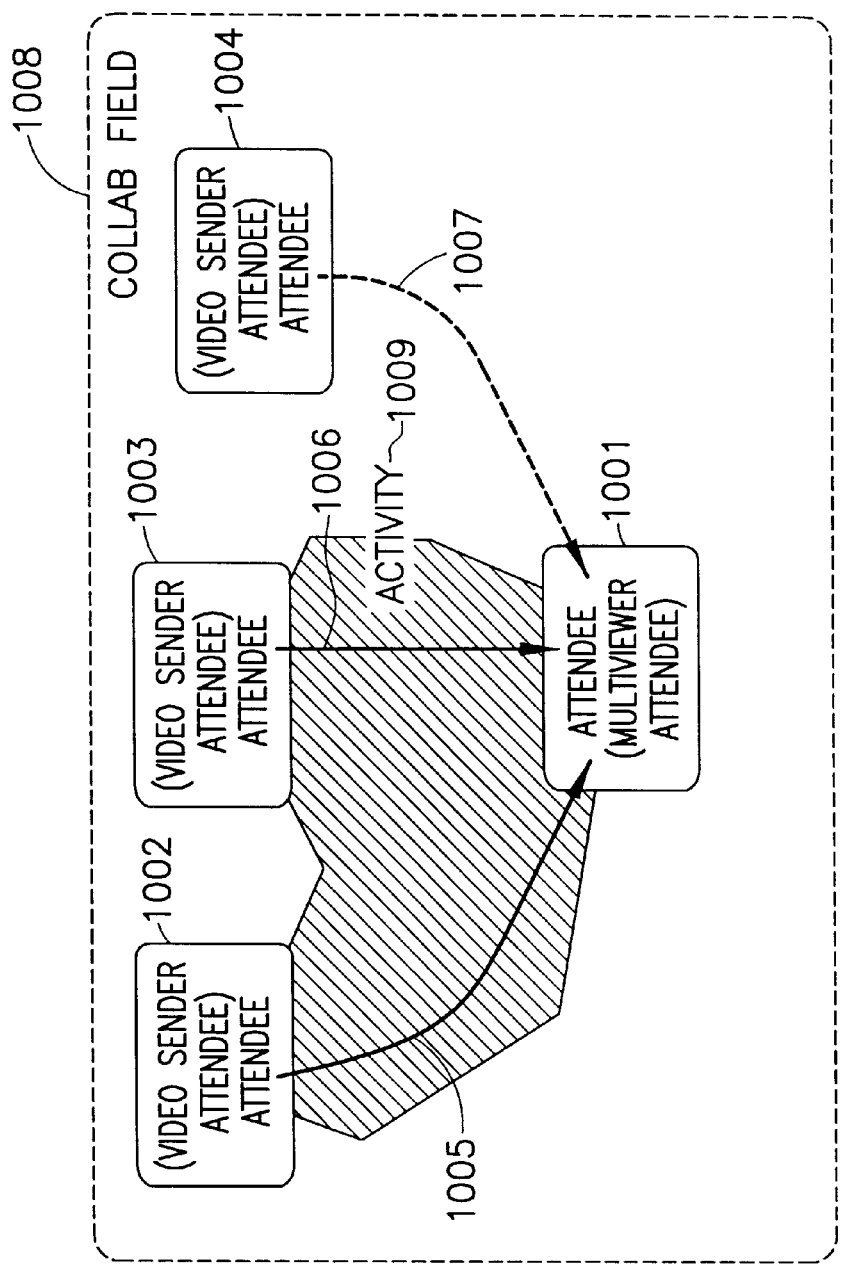
FIG. 10 is a view showing an example of the C/A object formed by the awareness system.

FIG. 10 shows CollabField and Activity formed by the awareness system in such description.

More specifically, the CollabField formed by Awareness Session is composed of an Attendee corresponding to a MultiViewerAttendee and Attendees corresponding to plural VideoSenderAttendees and only contains Cpaths directed from the latter to the former. Referring to FIG. 10, each of Attendees 1002, 1003, 1004 is correlated with a VideoSenderAttendee, and there are formed Cpaths having the Attendee 101, correlated with the MultiViewerAttendee, as the receiver. These components constitute CollabField 1008.

In FIG. 10, Cpaths 1005, 1006, belonging to Activity 1009, are capable of actually receiving and displaying the data of the moving image and the voice from the VideoSender processes, but Cpath 1007, not belonging to Activity 1009 and being inactive, is incapable of receiving data from the VideoSender process which manages the Attendee 1004. However Cpath 1007 may become active under another situation. In case plural Attendees are present corresponding to plural MultiViewers, there exist plural AwarenessSessions having CollabField and Activity as explained above. The Cpath 1007 is inactive in the illustrated situation, but a corresponding Cpath may be rendered active for a different Attendee.

Now the mode of control of the application behavior by the incorporated coordinative work model description will be explained with reference to FIG. 11, and the function of a model mapping module 1116 in the process to be explained is represented by a flow chart in FIG. 12. The functions of model mapping modules 1117, 1118 are identical with that of the model mapping module 1116 as shown in FIG. 12 and will not, therefore, be explained in particular.

Figure 11:
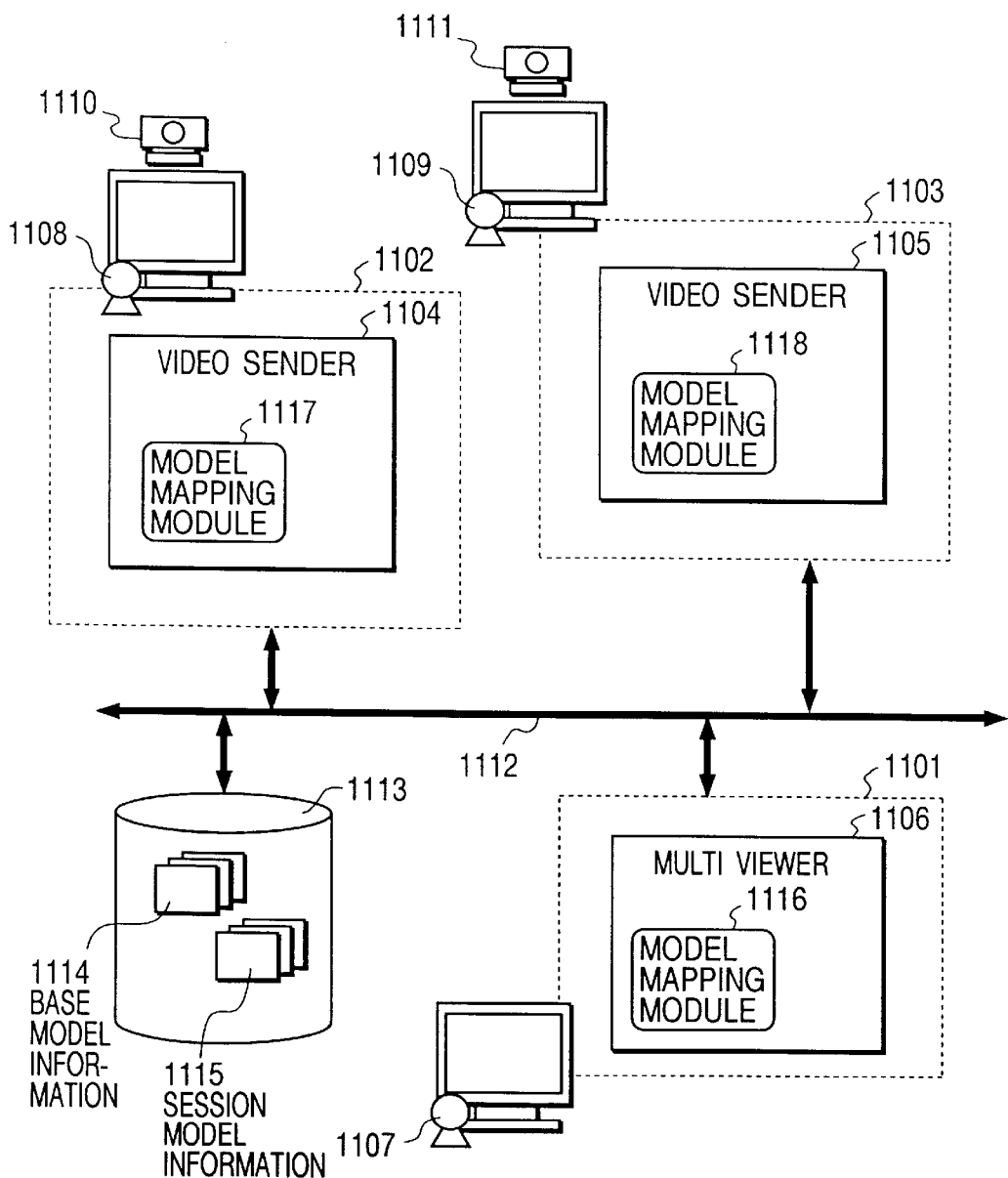
FIG. 11 is a view showing the process flow in the foregoing system.
Figure 12:
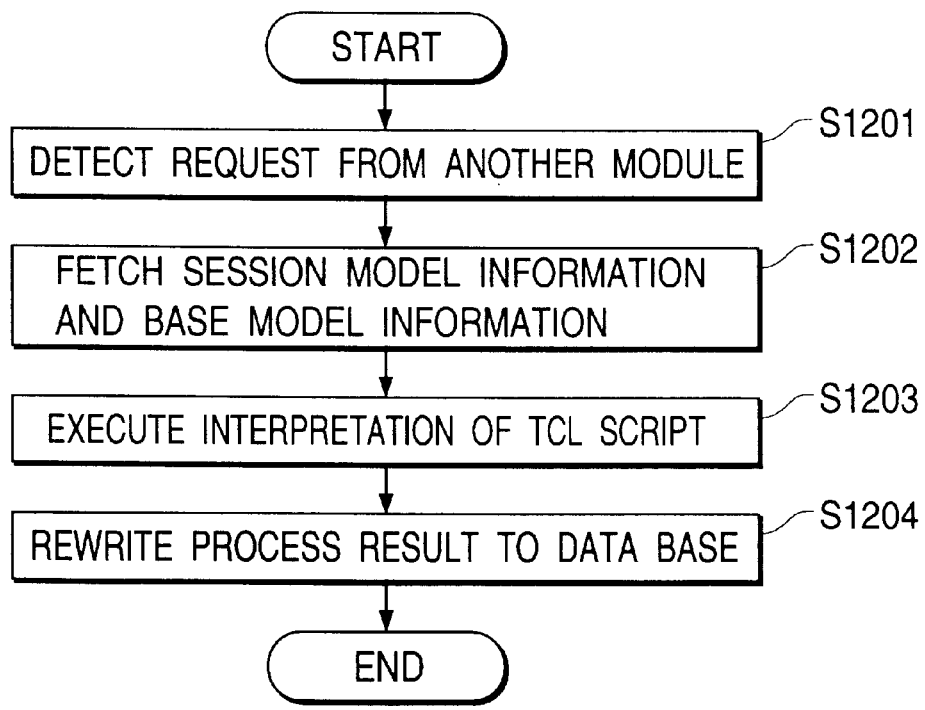
FIG. 12 is a flow chart showing the process flow in FIG. 11.

In FIG. 11, it is assumed that three users 1107, 1108, 1109 are conducting a conference by the present system, utilizing machines 1101, 1102, 1103 connected by a network 1112. In the machines 1102, 1103 used by the users 1108, 1109 there are installed cameras 1110, 1111 and there are respectively activated the Videosenders 1104, 1105. In fact the user 1108, 1109 can also activate MultiViewers, but, for the purpose of simplicity, it is assumed that MultiViewer 1106 is activated only in the environment of the user 1107.

Now, referring to FIG. 11, it is assumed that the user 1107 requests that MultiViewer 1106 receives the moving image from VideoSender 1105 and effects its display. (It is assumed that, at this point, the data transfer connection is not yet formed between MultiViewer 1106 and VideoSender 1105.)

Upon receiving the request from the user, MultiViewer 1106 calls the interface of the model mapping module 1118 and requests the request to be processed. Receiving the user request (S1201), the model mapping module 1118 extracts the session model information 1115 and the base model information 1114 from the database 1113 (S1202) and interprets the TCL scripts therein thereby executing the request from the user (S1203). In the present case, there is executed the MultiViewerAttendee process described in the session model information 1115. This process is finally executed as an operation on the base model information, and the result is re-written, by the model mapping module 1116, in the base model information 1114 and the session model information 1115 in the database 1113 (S1204).

Then the result is informed to the VideoSender 1105 by the variation informing function of the database 1113.

VideoSender, upon recognizing an operation on the base model information managed thereby, executes a process corresponding to such operation.

The process requests, receivable by VideoSender 1105 as a result of process of MultiViewer 1106, are followings, as in the first embodiment:

addition of Cpath to CollabField
deletion of Cpath from CollabField
addition of Cpath to Activity
deletion of Cpath from Activity.

In response to such process requests, VideoSender 1105 executes following processes:

addition of Cpath to CollabField
To form the actual transmission path for the moving image and the voice, corresponding to Cpath.
deletion of Cpath from CollabField
To close the actual transmission path for the moving image and the voice, corresponding to Cpath.
addition of Cpath to Activity At first the user of VideoSender is given a display that an awareness reference is requested by MultiViewer, and the discretion of the user is requested. The user executes MakeAvailableFor or MakeDisableFor, depending on the situation. Execution of MakeAvailableFor starts data transmission to the actual transmission path for the moving image and the voice corresponding to Cpath. Execution of MakeDisableFor renders Cpath inactive and terminates data transmission to the actual transmission path for the moving image and the voice.

deletion of Cpath from Activity
To terminate data transmission in the actual transmission path for the moving image and the voice corresponding to Cpath.

As explained in the foregoing, the present embodiment defines the base model as the description means of the coordinative work form and the session model description for describing the awareness by the base model, and provides a model mapping module executing such definitions.

It also provides the session model description for the remote awareness system, and also provides means for executing control matching the coordinative work model of the application, by incorporating the model mapping modules in the two applications, VideoSender and MultiViewer.

The present embodiment is different in configuration from the first embodiment, but utilizes a base model equivalent to that therein, so that the "conference" system of the first embodiment can also be realized in the present embodiment.

In such case, as "conference" and "awareness" can be described by the base model, there can be realized a system uniting these two coordinative work forms and allowing mutual shift, by adding a process of shift from "awareness" to "conference" to the base model.

The present embodiment of the invention, managing the base model and the session model in the form of scripts of character trains, allows the user to suitably vary the contents thereof utilizing the function of the database. Therefore the variation or expansion of the session model can be achieved easily.

Also thus realized awareness system itself has flexible expansivity because of the structure based on the base model, and can function without being influenced by the number or configuration of VideoSenders and MultiViewers. As the behaviors of ViewSender and MultiViewer are basically described as processes for the operations on the base model, the variations in ViewSender and MultiViewer can be limited to the user interfaces even when the session model is expanded.

In the following there will be explained another embodiment of the present invention, representing a cooperation of synchronized applications for CSCW (computer supported coordinative work), designed for supporting the coordinative works executed synchronously in spatially dispersed environments.

Figure 13:
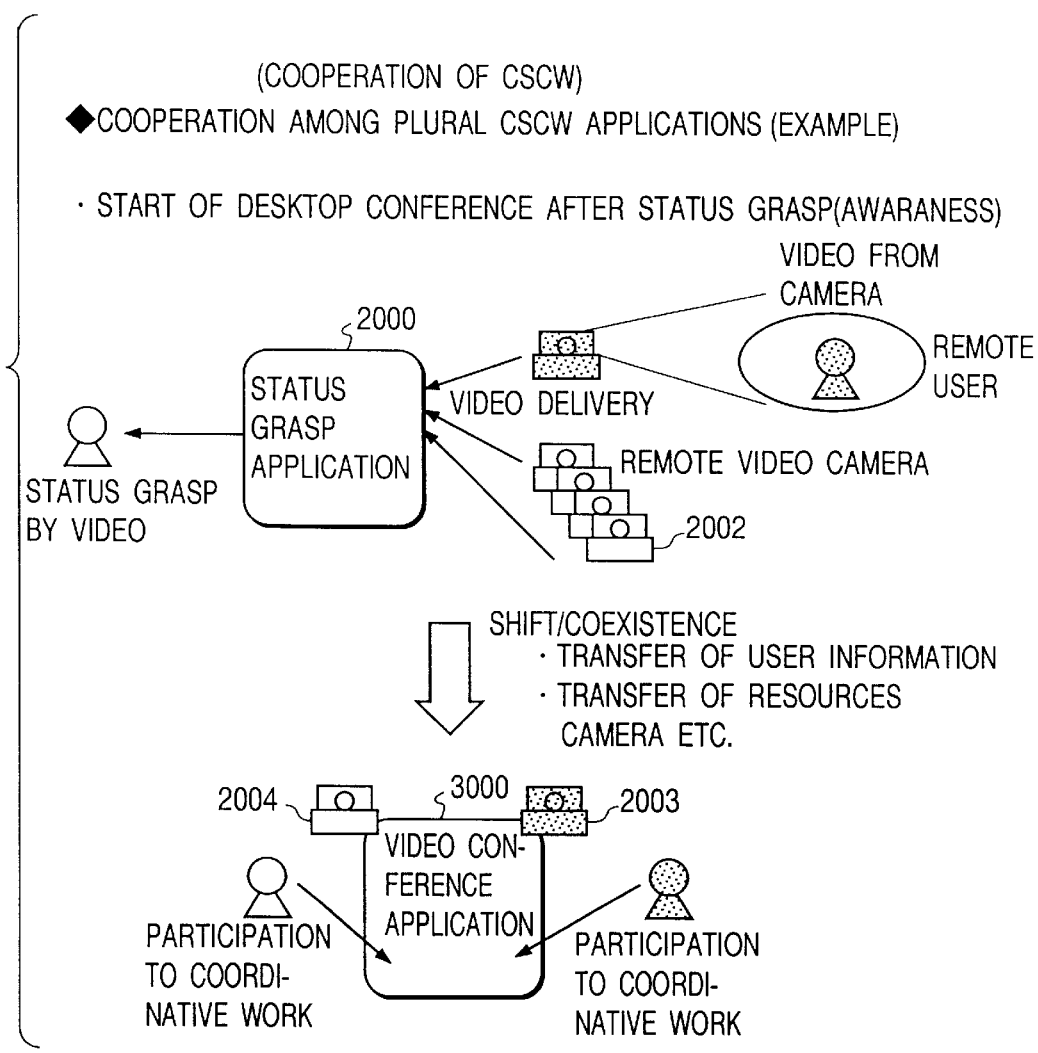
FIG. 13 is a view showing shift from an awareness application 2000 to a video conference application 3000 in another embodiment of the present invention.

Now there is considered a situation shown in FIG. 13 where, in the combination of a "video conference application" and a "remote awareness application" for referring to the image of a video camera in a distant location, the presence of a user is at first confirmed by the "remote awareness application" and a work is then started with such user by the "video conference application".

In such combination, support is desired for a smooth shift from a search/confirmation operation for the user in a "awareness application" 2000 to a coordinative work in a "video conference application" 3000 shown in FIG. 13. For meeting such requirement, it is necessary to realize transactions such as the transfer of information for example on the users between the two CSCW applications and the efficient transfer of the resources such as a camera 2002 used in the awareness application to the video conference application, thereby efficiently resolving the mismatching on the user interface or the competition between the CSCW applications in the resources. Such requirement also occurs when the "awareness application" 2000 and the "video conference application" 3000 function simultaneously (co-existence).

Figure 14:
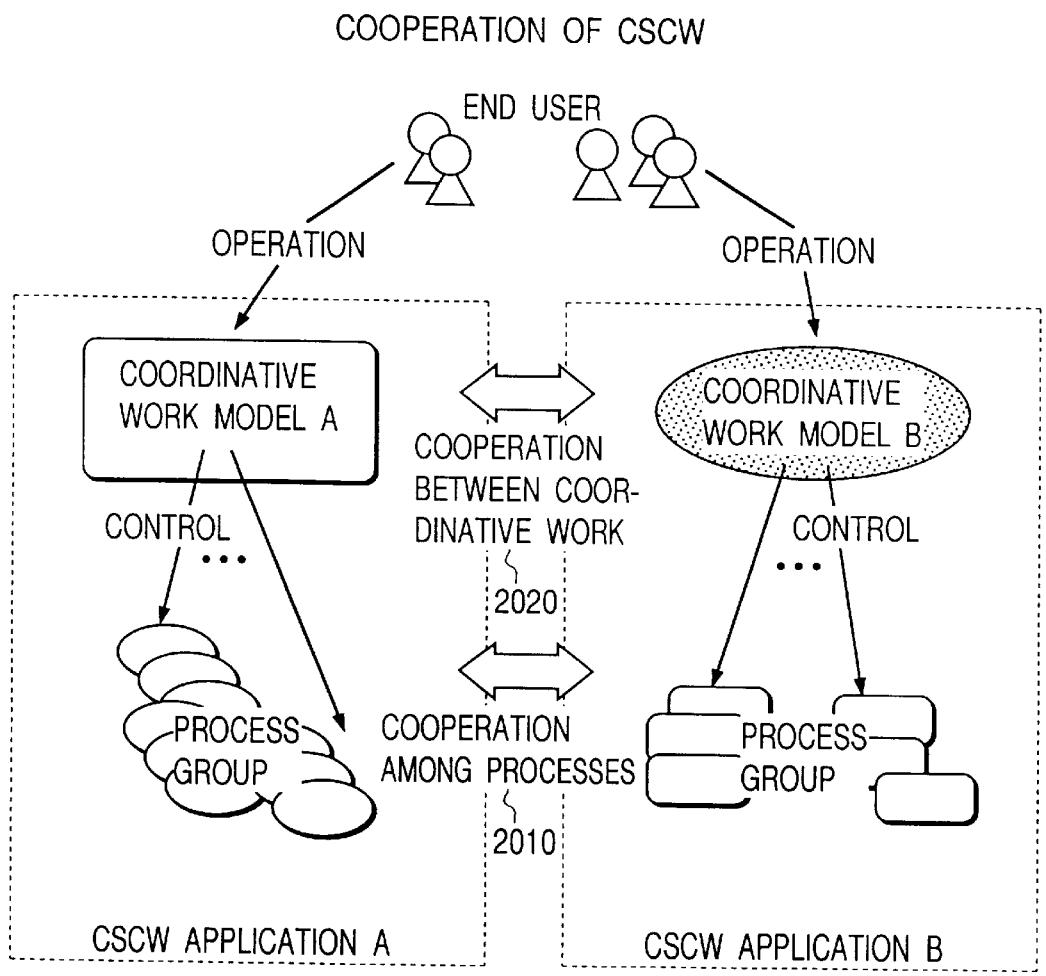
FIG. 14 is a view showing coordination of CSCW applications in another embodiment.

Therefore, "cooperation of CSCW applications" is illustrated in FIG. 14 and is defined to indicate various interactions between the CSCW applications in case of:
  shift from a CSCW application to another; and
  co-existence of two or more CSCW applications.

The CSCW application cooperation can be generally classified into the following two categories, according to the object of coordination:
  1. Cooperation 2010 between the coordinative process groups; and
  2. Cooperation 2020 between the coordinative work models.

In general, the CSCW application is realized by a group of processes functioning in plural dispersed hosts. Consequently, the shift/co-existence of the CSCW applications have an aspect of the shift/co-existence of process groups constituting the CSCW applications (hereinafter called coordinative process groups).

"1. Cooperation between the coordinative process groups" 2010 means cooperation required in realizing shift/co-existence of the coordinative process groups. Such cooperation is related to realization of efficient cooperation of the CSCW applications, and, in specific sense, following two kinds of cooperation can be conceived:

Resolving overlapping of hardware resources and software modules usable in common:

The CSCW applications to be subjected to shift may utilize resources such as a video camera or a microphone in common or may have a same program or process in common. In such case, efficient shift/co-existence can be realized by re-utilization or common use of such resources or processes. Without such support, there may be encountered a drawback that a same program is activated at every request.

Access control to hardware resources not usable in common:

In case of co-existence of the coordinative work forms, there inevitably occurs a situation where the resource itself only permits an exclusive access. In such case a mechanism between the CSCW applications is indispensable for the access control to the resources.

"2. Cooperation between the coordinative process groups" 2020, constituting the other type of cooperation, means cooperation of the coordinative work forms such as "conference", "lecture meeting" and "coordinative writing" provided by the CSCW applications to the users.

In the cooperation, what is important is the user interface how to uniformly presenting the plural CSCW applications to the users. In this sense there are generated various interactions depending on the coordinative work models to be considered. In the following there are explained representative examples of such cooperation:

Control of correlation between the components of the coordinative work models:

Different coordinative works have different components, but certain correlation may occur between such components in case of shift/co-existence.

As an example, there is considered the aforementioned shift from the "remote awareness application" 2000 to the "conference application" 3000. In the "remote awareness application" 2000, the video camera in the remote location is a basic component in the coordinative work form. On the other hand, in the "conference application" 3000, the user constituting the attendee of the conference is a basic component.

In the shift between the two CSCW applications, there is conceived a correlation that a person fetched by the video camera before shift becomes the user after the shift. In the present embodiment, by rendering such correlation controllable, there can be avoided a situation where the person fetched in the camera has to be designated as an attendee of the conference after the "conference application" 3000 is activated.

Such support of the coordination is however hindered by a fact that, in the CSCW applications to be subjected to the shift/co-existence:
  difference in process configuration and in access forms to the resources; and
  difference in components of the coordinative work models and behaviors thereof:

are not necessarily made clear. Unless such differences are made clear, it is not possible to determine the correlations of the components and is therefore difficult to realize the description (programming)/control of the cooperation. These difficulties will become severer in realizing "cooperation between coordinative process groups" and "cooperation between coordinative work models", with the diversification of the CSCW applications.

In consideration of the foregoing, the present embodiment supports realization of the cooperation of the CSCW applications, in the groupware framework CCF (collaboration control facility), by:

enabling description of configuration/form/behavior; and providing programming and control means for the cooperation based on such description;

both on the coordinative process groups and the coordinative work models.

In the following we will first outline the CCF, and then explain the realization in the CCF, of each of the cooperations of the coordinative process groups or the coordinative work models.

The CCF as the groupware framework provides a C++ CCF Toolkit, which provides a programmer interface for describing the configuration, behavior etc. of the coordinative process groups and the coordinative work models. The CCF Toolkit also provides a programmer interface for describing the coordination to be realized between the CSCW applications.

The CSCW application, prepared with the incorporated CCF Toolkit, is controlled/managed by a CCF Core System 3501.

The CCF Core System 3501 is composed of two programs, which are CCF Core Server and CCF Core Interface. The former is a concentrated server for managing the information on the CSCW application, and the latter is a program for providing the user with a control interface for the CSCW application, such as the start thereof.

Figure 15:
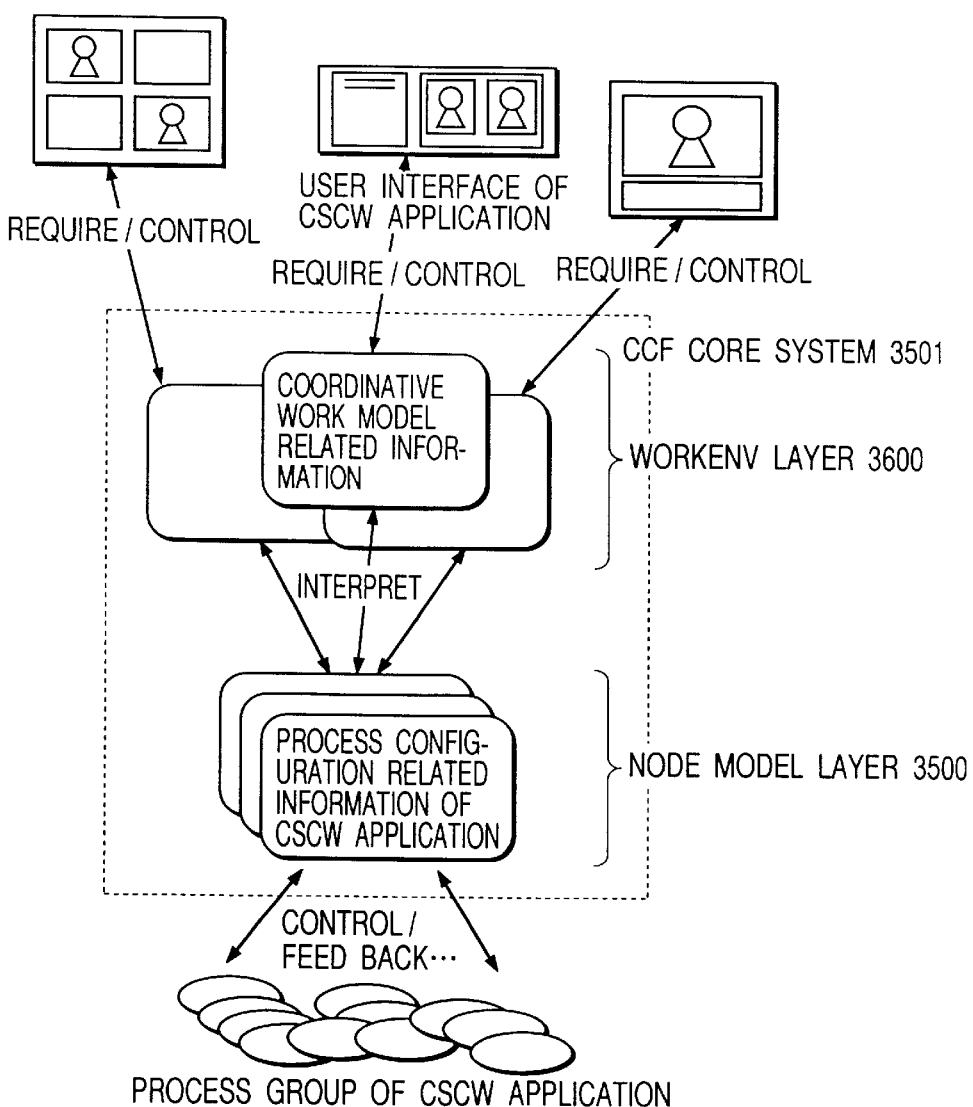
FIG. 15 is a view showing the configuration of CCF Core in another embodiment.

FIG. 15 shows the concept of the CCF Core System 3501.

The interior of the CCF Core System is composed of the following two layers, corresponding to the aforementioned two types of cooperation:

Node model layer 3500

It manages what processes constitute the CSCW application and how the processes are correlated as the components. It executes control, such as start and end, of the processes of the CSCW application, based on a Node model thereof to be explained later. In the control of cooperation, it provides a cooperation mechanism between the coordinative process groups.

WorkEnv layer 3600

It handles the coordinative work model of the CSCW application, and manages and controls the correspondence between the operations on the coordinative work model provided by the CSCW application and each process in the Node model layer. In the control of coordination, it provides a cooperation mechanism between the coordinative work models.

In the following there will be explained the support for cooperation in the coordinative process groups and the coordinative work models.

The cooperation support for the coordinative process groups is executed by the CCF in the following manner, under the management of the Node model layer shown in FIG. 16.

The Node model layer supports the cooperation by providing:

a Node model for describing the coordinative process group constituting the CSCW application; and a cooperation control mechanism based on the Node model.

The Node model shown in FIG. 16 is a CSCW application control model in a program/process unit not considered, and is composed of the following components:

Nodes 4010, 4020

They abstracts the user environment or the host where the program of the CSCW application functions, and function as the management unit for Resource and Module to be explained later.

Module 4030

It abstracts the process constituting the CSCW application. The Module managed in the Node can be regarded as a process on the host corresponding to the Node.

Resource 4050

It represents a resource exemplified by external input/output devices such as a camera or a microphone. The Resource managed in the Node can be regarded as an external input/output device installed in the host corresponding to the Node or as a management server therefor.

Channel 4060

Channel represents a communication path between the Module 4030 and the Resource 4050. A channel can represent not only a 1:1 communication but also a 1:N communication such as broadcasting. The Channel can be formed not only between the Module and the Resource within a same Node, but also between the Module and the Resource belonging to different Nodes.

The Node model describes:

functioning processes;

resources to be used; and access busses to the communication paths between the processes and to the resources;

in each host where the coordinative process group of the CSCW application functions.

The CSCW application is represented, by the Node model, as a group of Nodes correlated with the relevant hosts. The above-mentioned components are respectively given unitary names and are collectively managed by the CCF Core Server, which monitors the actual behavior of the CSCW application, utilizing the Node model, and executes controls when necessary.

For forming the above-explained Node model, it is necessary to describe, in advance, the Node formed by each groupware application.

The information constituting the basic design of such Node model is called Node frame information, and the interface required for the preparation thereof is provided by the C++ class group of the CCF Toolkit.

The Node frame information is managed also by the CCF Core Server, and is used, when necessary, for the preparation of the Node model.

As explained in the foregoing, the cooperation of the coordinative process groups can be processed as common-use/access control for the processes and resources required in the shift/co-existence of the CSCW applications.

Such common-use/access control of the processes and resources can be described and controlled as a replacement process for the Node, Module, Resource and Channel.

FIG. 17 shows the algorithm for the cooperation process in this Node model, in case of a shift from a CSCW application A to another B. Now considered is a host where both applications form Nodes, and it is assumed that the shift is made from a Node 4010 in the CSCW application A to a Node 4020 in the CSCW application B ("before shift" in FIG. 17). The shift between these Nodes is realized by reconstructing the Node 2 with the Modules, Resources and Channels of the Node 1.

This reconstruction is achieved, if the Node 1 before shift and the Node 2 after shift have common Modules (ovals in FIG. 17) and common Resources (rectangles in FIG. 17) by re-utilizing these components (as shown in "in shifting" in FIG. 17), except for a case where the re-utilization is inhibited for such Module or Resource even it has a same name. A Channel is not re-utilized even if the name is same, unless the Modules or the Resources at both ends are re-utilized. In thus re-utilized Modules, Resources and Channels, the corresponding processes are utilized as a part of the CSCW application B.

Once the components to be re-utilized are determined, there are generated the Modules and Resources lacking for the formation of the Node 2 and at last all the Channels are generated ("after shift" in FIG. 17). New processes are activated by this process, and the communication paths are formed between the re-utilized processes and the new processes.

The shift from the CSCW application A to B is completed by executing the above-explained process for all the Nodes.

The process for co-existence of the CSCW applications is executed in a similar manner, but there may occur a situation where either one alone of the application can make access to the Resource. In such case, on the Node model, same Resources are present for both Nodes, but either one alone can form the Channel between such Resource and another Module. The access control between the CSCW applications sharing the resource can be handled on the Node model, by replacing the Channel according to the necessity.

As explained in the foregoing, the developer of the CSCW application can provide information necessary for the cooperation with another CSCW application in the coordinative process group, by the description of the CSCW application by the Node model and by the description of the re-utilizable Module, Resource and Channel therein.

With respect to the CSCW application described by the Node model, the Node model layer of the CCF Core System manages the correlations between the components on the Node model and the actual hosts, processes, resources and communication paths.

There are thus executed processes of reflecting the operations on the Node model to the actual hosts, processes, resources and communication paths, and also reflecting the results onto the Node model by monitoring the behaviors of the actual hosts, processes, resources and communication paths.

The reflection from the Node model to the actual results is executed when the user requests the operations of the CSCW application for example through the CCF Core Interface.

The reflection from the actual hosts, processes, resources and communication paths to the Node model is executed, after an independent action of the CSCW application, when such action is informed to the CCF. Also in case the CCF Core Server detects an abnormal process termination for example by an error, there is executed erasure of the relevant Modules, Resources and Channels.

In the following there are listed possible operations on the Node model and the corresponding CCF processes:

Generation and Erasure of Node
Generation and erasure of Modules, Resources and Channels in the Node;
Generation and Erasure of Module
Start/end of corresponding program;
Generation and Erasure of Resource
Start/end of corresponding resource management server;
Generation and Erasure of Channel
Generation/erasure of corresponding communication path.

In the cooperation of the coordinative process groups, what is important for realizing the access control etc. is realization of the Channel control. The control of the communication path corresponding to Channel is executed by a handler process for the following message, transmitted from the CCF to the program of the groupware application. This message handler is provided by the developer of the CSCW application and forms the actual communication path by socket, rpc etc.:

CREATE-CHANNEL Generation of Channel
DESTROY-CHANNEL Erasure of Channel

Such communication path formation will be explained with reference to FIG. 18.

Figure 18:
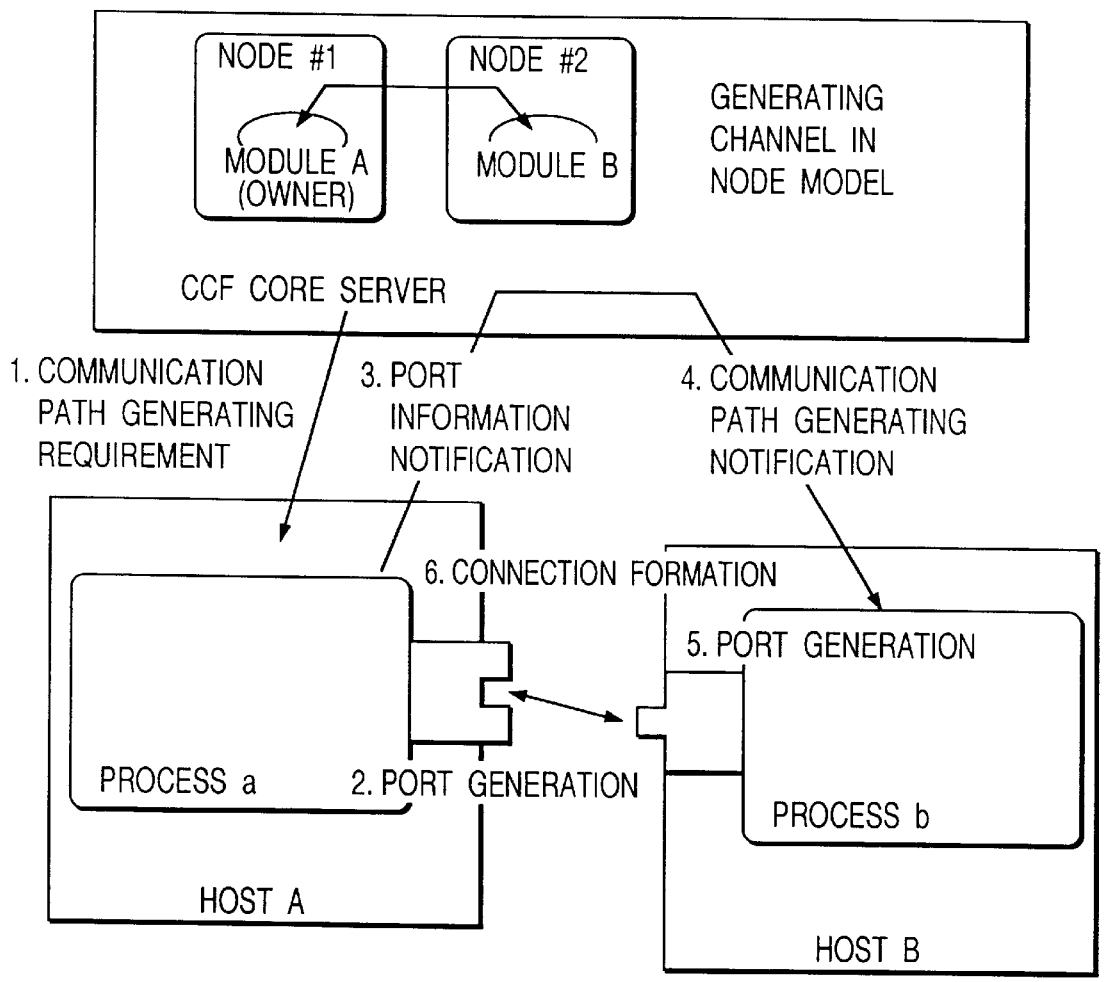
FIG. 18 is a view showing generation/erasure of a communication path in another embodiment.

In the communication path formation, one of the Modules or the Resources at both ends of the Channel becomes an owner (Node #1 in FIG. 18), which effects generation/erasure of the communication path in response to the above-mentioned message, in the numbered order in FIG. 18. The process corresponding to the non-owner Module or Resource is given a message informing the generation/erasure of the communication path, after the end of the owner process. Since such informing message contains information such as a port number required for establishing the communication path by socket, RPC etc., the process receiving such informing message is rendered capable of establishing the communication path.

The WorkEnv layer of CCF handles the correlation of information between the coordinative work models in the cooperation thereof.

Figure 19:
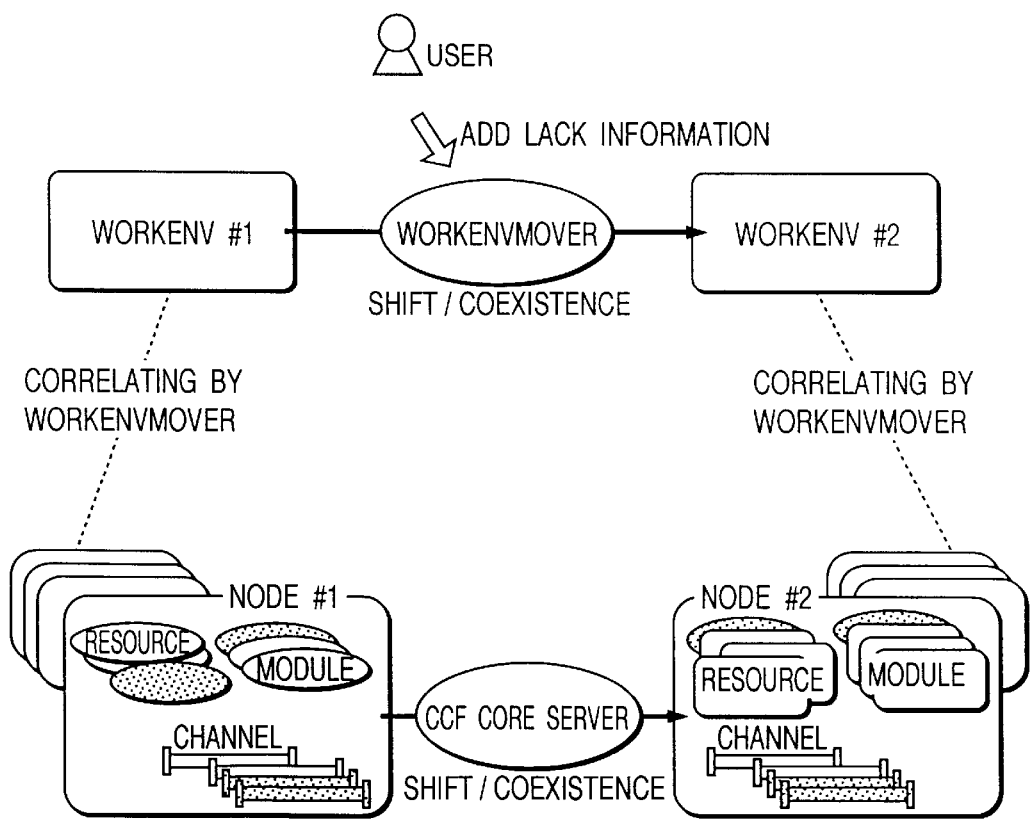
FIG. 19 is a view showing coordinative support for Work Env layer 3600 shown in FIG. 15.

In the following there will be explained the cooperation support in such WorkEnv layer, with reference to FIG. 19.

The mechanism of the cooperation support for the coordinative process groups in the Node mode layer is provided by the CCF Core Server, but the cooperation control mechanism between the coordinative work models is provided from the CSCW application.

Instead, the CCF provides:

a $C^{++}$ interface for describing the coordinative work model such as "conference" or "lecture meeting" provided by each CSCW application;

a $C^{++}$ interface for describing or controlling the correlation of the components, such as the users, between the two coordinative work models.

The description of the coordinative work models is achieved by programming:

correlation between the components of the coordinative work models and those of the Node model; and correlation between the operations to the components of the coordinative work models and the operations on the Node model, and adding such program to the CCF Core System. This program is called WorkEnvManager.

Also the correlation between the coordinative work models is described as a program, called WorkEnvMover, which is activated by the WorkEnv layer of the CCF Core System at the cooperation of the CSCW applications and executes common-use/re-utilization of the information between the coordinative work models.

The workEnvManager and the WorkEnvMover are provided by the developer of the application as a part of the CSCW application, and the CCF realizes the cooperation of the coordinative work models, utilizing these programs.

In the present embodiment, the cooperation of the CSCW applications is represented by an interaction between the process groups constituting the CSCW applications and an interaction between the coordinative work models provided to the users by the CSCW applications.

The support of the cooperation can be realized by:

enabling description of configuration/form/behavior of the coordinative process group/coordinative work model; and providing programming and control means for the cooperation, based on such description.

The CCF describes or controls the interaction between the coordinative process groups by the Node model. Also for the support between the coordinative work models, it provides a programmer interface for describing and controlling the relation between the components of the model.

However, in the support basically designed for the coordinative work models, it is also necessary to consider the cooperation other than the correlation between the components.

The present invention also includes a computer-readable medium which stores the software of the above-explained coordinative works. Such medium can be a ROM, a disk-shaped medium or a tape-shaped medium, as long as the software of the sequences of the foregoing embodiments is stored in a computer-readable form.

As explained in the foregoing, the embodiments of the present invention provide various advantages, such as:

modeling various coordinative work forms, thereby facilitating the realization of a coordinative work support system supporting such coordinative works;

modeling the state changes in various coordinative work forms, thereby facilitating the realization of a corresponding system;

correlating various coordinative work forms, thereby facilitating the shift from a coordinative work form to another; and enabling realization of an application not influenced by the difference in the coordinative work form or the expansion thereof.

What is claimed is:

1. A coordinative work environment construction system, the system comprising:

support means for supporting a plurality of coordinative works by plural computers;

description means for describing logical components, a relation between the logical components, and a relation between a component of the logical components and a logical operation of the coordinative works, wherein the logical components are defined by action of the coordinative works;

shifting means for shifting one coordinative work to another coordinative work on the basis of the described logical components and the relation between the component of said logical component and the logical operation of the coordinative work, wherein said shifting means is adapted to shift by re-utilization or common use of the described logical components and a relation between the logical components and the logical operation of the coordinative works; and means for effecting an actual work management process by transmitting a moving image and voice, fetched from a camera and a microphone, on the basis of the described logical components and operations of the coordinative work.

2. A coordinative work environment construction system according to claim 1, wherein said description means is adapted to describe the logical components, a relation between the respective components, and a relation between the component of said logical component and a logical operation of the coordinative work utilizing an information transmission path between attendees of the coordinative work.

3. A coordinative work environment construction system according to claim 2, wherein said description means is adapted to describe the logical components, relation between the respective components, and relation between the component of said logical component and a logical operation of the coordinative work, further utilizing a coordinative work environment composed of the attendees of said coordinative work and said transmission path.

4. A coordinative work environment construction system according to claim 3, wherein said description means is adapted to describe the coordinative work, utilizing the combination of said information transmission paths capable of information transmission.

5. A coordinative work environment construction system according to claim 4, wherein said description means is adapted to provide description by class and object.

6. A coordinative work environment construction system according to claim 4, wherein said description means is adapted to provide description by script.

7. A coordinative work environment construction system according to claim 1, wherein said description means is adapted to describe, as said logical components, a relation between the respective components, and a relation between the component and a logical operation of the coordinative work description, components of the logical components, relation between the respective components, and relation between the component of said logical component and a logical operation of the coordinative work and operations for said components.

8. A coordinative work environment construction system according to claim 7, wherein said description means is adapted to describe the components and the operations for said components by a class and an object.

9. A coordinative work environment construction system according to claim 7, wherein said description means is adapted to describe the components and the operations for said components by a script.

10. A coordinative work environment construction system according to claim 7, wherein said means for effecting the coordinative work management process is adapted to effect operation management, utilizing class and object describing the components and the operation for said components.

11. A coordinative work environment construction system according to claim 7, wherein said means for effecting the coordinative work management process is adapted to effect operation management, utilizing an interpreter for interpreting the script describing the components and the operation for said components.

12. A coordinative work environment construction method, comprising the steps of:

supporting a plurality of coordinative works by plural computers;

describing logical components and operations of the coordinative works, wherein the logical components are defined by action of the coordinative works;

shifting one coordinative work to another coordinative work on the basis of the described logical components and the relation between the component of said logical component and the logical operation of the coordinative work, wherein said shifting is adapted to shift by reutilization or common use of the described logical components and a relation between the logical components and a logical operation of the coordinative works; and effecting an actual coordinative work management process by transmitting a moving image and voice, fetched from a camera and a microphone, on the basis of the described logical components, a relation between the respective components, and a relation between the component of said logical component and a logical operation of the coordinative work.

13. A coordinative work environment construction method according to claim 12, comprising, in describing said logical components, a relation between the respective components, and a relation between the component of said logical component and a logical operation of the coordinative work, representing the information transmission path between attendees of the coordinative work.

14. A coordinative work environment construction method according to claim 13, comprising, in describing logical components, a relation between the respective components, and a relation between the component of said logical component and a logical operation of the coordinative work, representing the coordinative work environment composed of the attendees and the information transmission path of the coordinative work.

15. A coordinative work environment construction method according to claim 14, wherein the coordinative work is represented by a group of said information transmission paths capable of information transmission.

16. A coordinative work environment construction method according to claim 15, wherein the description of said logical components, a relation between the respective components, and a relation between the component of said logical component and a logical operation of the coordinative work is provided by a class and an object.

17. A coordinative work environment construction method according to claim 15, wherein the description of said logical components, a relation between the respective components, and a relation between the component of said logical component and a logical operation of the coordinative work is provided by a script.

18. A coordinative work environment construction method according to claim 12, wherein the description of said logical components, a relation between the respective components, and a relation between the component of said logical component and a logical operation of the coordinative work describes components of said logical components, relation between the respective components, and relation between the component and a logical operation of the coordinative work and operations for said components, by the description method of said logical components, relation between the respective components, and relation between the component and a logical operation of the coordinative work.

19. A coordinative work environment construction method according to claim 18, wherein said components and said operations for the components are described by a class and an object.

20. A coordinative work environment construction method according to claim 18, wherein said components and said operations for the components are described by a script.

21. A coordinative work environment construction method according to claim 18, wherein the step of effecting the coordinative work management process comprises using a class and an object describing the components of said logical components, a relation between the respective components, and a relation between the component of said logical component and a logical operation of the coordinative work and the operations for said components.

22. A coordinative work environment construction method according to claim 18, providing, as said means for effecting the coordinative work management process, an interpreter for interpreting the script describing the components of said logical components, a relation between the respective components, and a relation between the component of said logical component and a logical operation of the coordinative work and the operations for said components.

* * * * *